United States Patent
Ye et al.

(10) Patent No.: US 11,494,854 B2
(45) Date of Patent: Nov. 8, 2022

(54) SYSTEMS AND METHODS FOR MANAGING WATCHLIST CONSTRAINTS ON AN ELECTRIC POWER GRID

(71) Applicant: Midcontinent Independent System Operator, Inc., Carmel, IN (US)

(72) Inventors: Hongxing Ye, Westlake, OH (US);
Fengyu Wang, Carmel, IN (US);
Shubo Zhang, Brooklyn, OH (US);
Stephen M. Rose, St. Paul, MN (US);
Yonghong Chen, Zionsville, IN (US);
Yaming Ma, Carmel, IN (US)

(73) Assignees: Midcontinent Independent System Operator, Inc., Carmel, IN (US);
Cleveland State University, Cleveland, OH (US)

( * ) Notice: Subject to any disclaimer, the term of this patent is extended or adjusted under 35 U.S.C. 154(b) by 377 days.

(21) Appl. No.: 16/783,293

(22) Filed: Feb. 6, 2020

(65) Prior Publication Data
US 2020/0258168 A1    Aug. 13, 2020

Related U.S. Application Data

(60) Provisional application No. 62/802,321, filed on Feb. 7, 2019.

(51) Int. Cl.
*G06Q 50/06* (2012.01)
*H02J 3/38* (2006.01)
(Continued)

(52) U.S. Cl.
CPC ....... *G06Q 50/06* (2013.01); *G06Q 10/06315* (2013.01); *G06Q 30/0202* (2013.01);
(Continued)

(58) Field of Classification Search
None
See application file for complete search history.

(56) References Cited

U.S. PATENT DOCUMENTS

2011/0054869 A1\* 3/2011 Li ........................ G06F 30/20
703/10
2012/0010757 A1 1/2012 Francino et al.
(Continued)

OTHER PUBLICATIONS

Amor et al.; "Constrained State Estimation—A Review"; Electrical Engineering and Systems Science Signal Processing; Cornell University; Dec. 2018.
(Continued)

*Primary Examiner* — Mohammad Ali
*Assistant Examiner* — Saad M Kabir
(74) *Attorney, Agent, or Firm* — BakerHostetler

(57) ABSTRACT

The present disclosure pertains to a system that may be configured to operate a power grid, including generation participants, consumers, and a controller that administers a market for the power generation participants and the consumers on the power grid. The operation of the power grid may include: performing power grid coordination calculations based upon, at least in part, constraints that pertain to the flow and/or congestion of power on the grid; and managing the coordination calculations by reducing a number of constraints used in the coordination calculations, the managing including a first step of coarse screening of the constraints, a second step of deterministic fine screening of the constraints, and a third step of statistical fine screening of the constraints. This second step may cause identification of constraints that are redundant and/or dominated by other constraints.

17 Claims, 13 Drawing Sheets

(51) Int. Cl.
  *G06Q 10/06* (2012.01)
  *G06Q 30/02* (2012.01)
  *H02J 3/00* (2006.01)

(52) U.S. Cl.
  CPC .............. *H02J 3/381* (2013.01); *H02J 3/003* (2020.01); *H02J 2203/20* (2020.01)

(56) References Cited

U.S. PATENT DOCUMENTS

2014/0172503 A1* 6/2014 Hammerstrom ....... G06Q 50/06
  705/7.31
2020/0160411 A1* 5/2020 Sun .................... G06Q 10/0631

OTHER PUBLICATIONS

Passelergue et al.; "Managing congestion in a balancing market"; Int'l Conf. on Deregulated Electricity Market Issues in South-Eastern Europe; Areva; Sep. 2009; 7 pages.
Yao et al.; "Smart Dispatch System in North China Grid"; IEEE Power and Energy Society General Meeting; 2012; 8 pages.
Xavier et al.; "Transmission Constraint Filtering in Large-Scale Security-Constrained Unit Commitment"; IEEE Transactions on Power Systems; Dec. 2018; 3 pages.
O'Neill et al.; "Recent ISO Software Enhancements and Future Software and Modeling Plans"; Federal Energy Regulatory Commission; Staff Report; Nov. 2011; 42 pages.

* cited by examiner

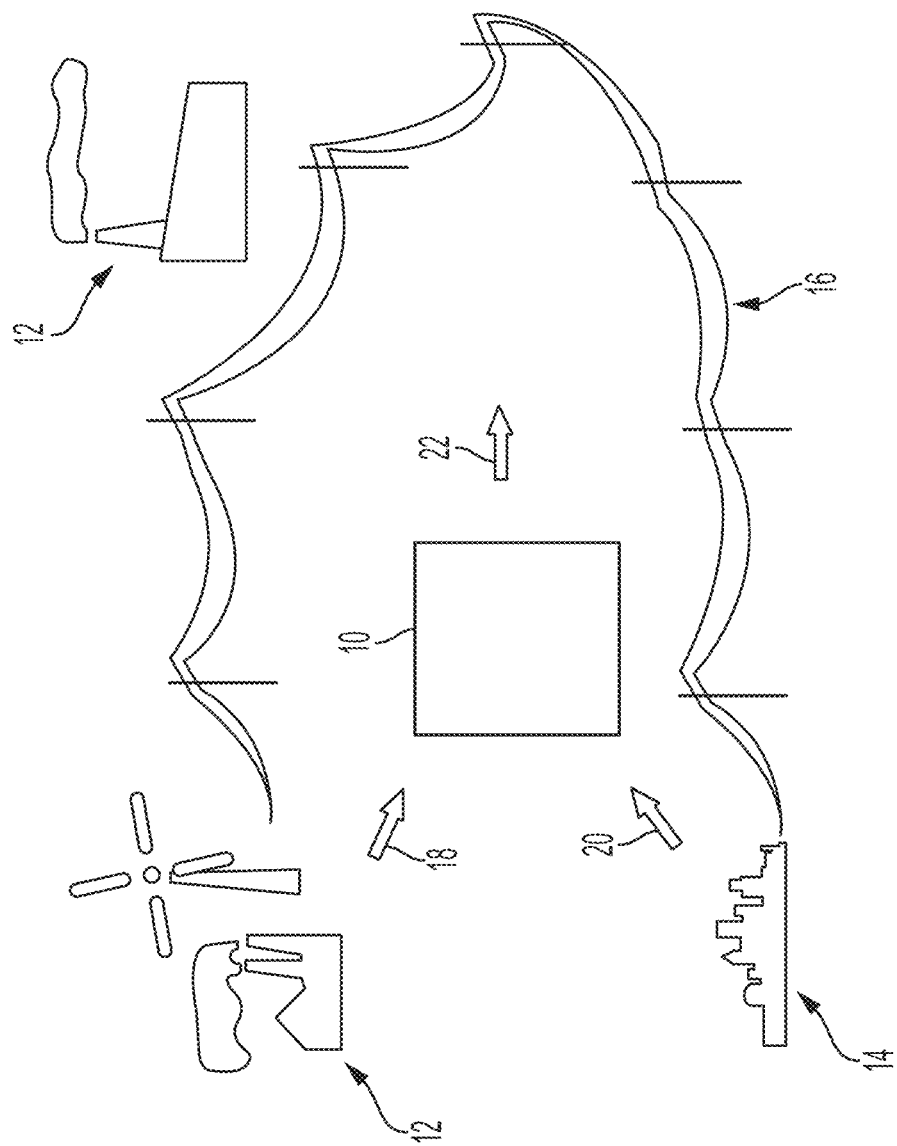

SYSTEMS AND METHODS FOR MANAGING WATCHLIST CONSTRAINTS ON AN ELECTRIC POWER GRID

CROSS-REFERENCE TO RELATED APPLICATIONS

This application claims the benefit of the priority date of U.S. provisional application 62/802,321 filed on Feb. 7, 2019 and entitled "System and Method for Managing Watchlist Constraints on an Electric Power Grid," the content of which is incorporated by reference herein in its entirety.

TECHNICAL FIELD

The present disclosure relates generally to systems and methods for accelerating a power grid controller's computational speed by providing a more efficient and rigorous watchlist constraint determination process.

BACKGROUND

Generally, in an electrical power grid control and administration system, watchlist constraints are conditions on the transmission network that pertain to the flow and/or congestion of the power on the transmission network. The number of watchlist constraints may be a main driver of slow computational performance for the controller, such as when determining outage coordination. There may be hundreds of watchlist constraints in the computational model, and only a subset of those constraints may be binding on the model. Based on a historical observation, for example, 20% or fewer of the total watchlist constraints may be binding. A constraint is considered to be binding if changing it also changes the optimal solution. Therefore, it may be desirable to more efficiently manage watchlist constraints and lower the computational complexity for the controller.

SUMMARY

Systems and methods are disclosed for managing watchlist constraints on an electric power grid. The disclosure provides a system and method for operating an electrical power grid, where the electrical power grid includes an electrical power grid, a plurality of power generation participants providing electrical power to the electrical power grid, a plurality of consumers drawing electrical power from the electrical power grid, and a controller that administers the market for the power generation participants and the consumers on the electrical power grid. The method may include: (i) performing power grid coordination calculations based upon, at least in part, constraints that pertain to the flow and/or congestion of power on the grid; and (ii) managing the coordination calculations by reducing the number of constraints used in the coordination calculations. The managing may include a first step of coarse screening of the constraints, a second step of deterministic fine screening of the constraints, and a third step of statistical fine screening of the constraints. The deterministic fine screening step may identify constraints that are redundant and/or dominated by other constraints. Management of watchlist constraints in a prescreening process may be taken care of by a day-ahead market (DAM) engine, no manual work by an operator being needed.

Accordingly, this disclosure provides exemplary ways of managing watchlist constraints for implementation by a controller that administers the market for electricity producers and users on an electric power grid. The method may be implemented by a system comprising one or more hardware processors configured by machine-readable instructions and/or other components. The system comprises the one or more processors and other components or media, e.g., upon which machine-readable instructions may be executed. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features may be apparent from the following description, including the drawings and claims. The drawings, though, are for the purposes of illustration and description only and are not intended as a definition of the limits of the disclosure.

FIG. 13 illustrates an example of a system in which operational characteristics and constraints are managed, in accordance with one or more embodiments.

DETAILED DESCRIPTION

Figure 1:
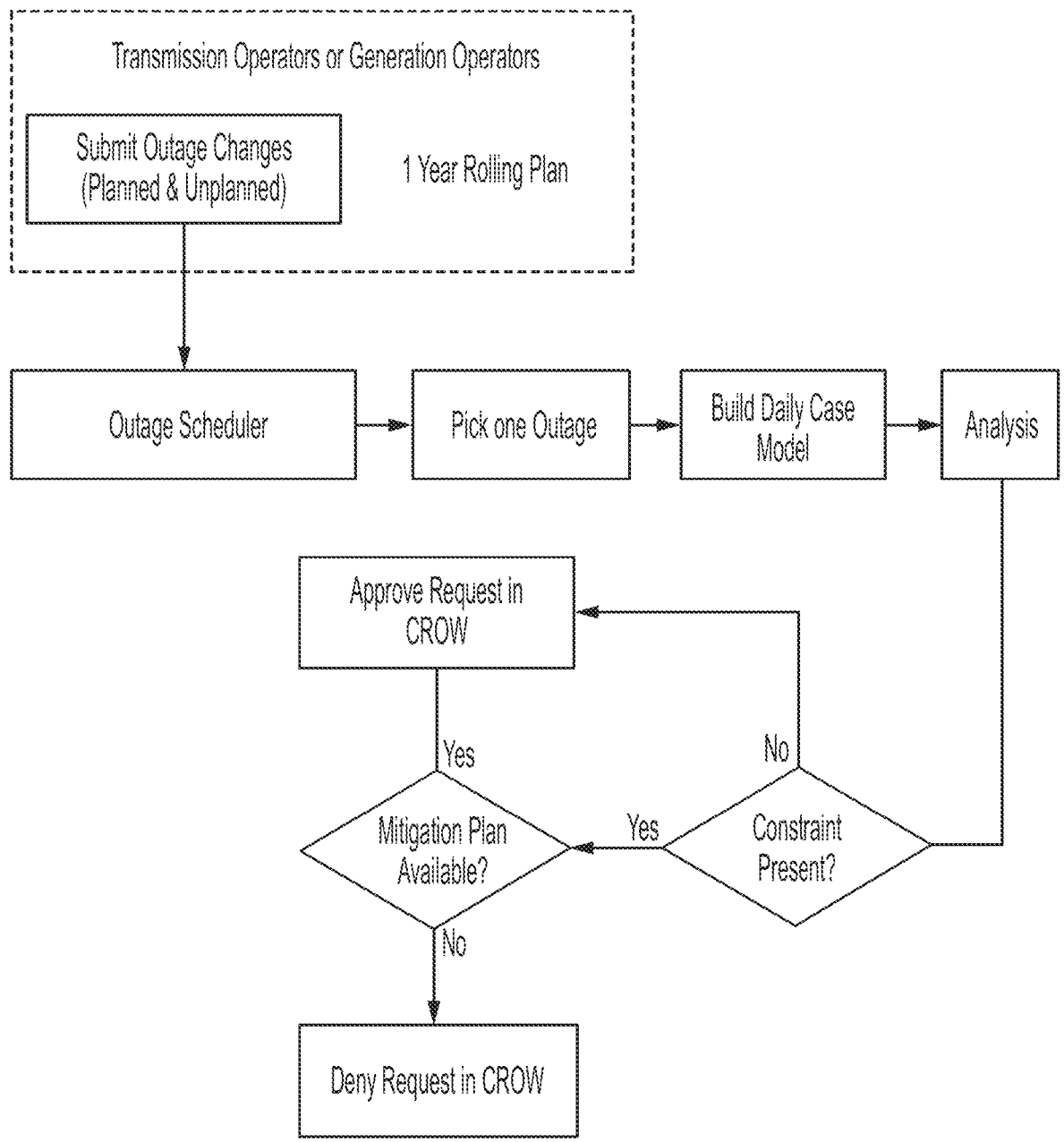
FIG. 1 illustrates a process for facilitating outage coordination, in accordance with one or more embodiments.

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

FIG. 13 illustrates an example of a system in which operational characteristics and constraints may be managed, in accordance with one or more embodiments. Referring to FIG. 13, an exemplary controller 10, according to the current disclosure, administers the market for electricity producers 12 and users 14 on an electric power grid 16. Some exemplary functions of the controller 10 include monitoring energy transfers on the transmission system, scheduling transmission service, managing power congestion, operating DA and RT energy and operating reserves (OR) markets, and regional transmission planning. Certain of the electricity producers 12 may be able to offer combined cycle configurations, which may utilize a combination of physical power producing units such as one or more combustion turbines (CT), steam turbines (ST), DBs, combined cycle, pump storage, batteries, nuclear, hydro (pumped), wind, utility or rooftop photovoltaic (PV), and the like.

Controller 10 of FIG. 13 may comprise electronic storage. Electronic storage of the system may comprise media that electronically stores information. The electronic storage media may comprise system storage that is provided integrally (i.e., substantially non-removable) with the system and/or removable storage that is removably connectable to the system via, for example, a port (e.g., a USB port, a firewire port, etc.) or a drive (e.g., a disk drive, etc.). The electronic storage may be (in whole or in part) a separate component within the system, or the electronic storage may be provided (in whole or in part) integrally with one or more other components of the system (e.g., a user interface device, the processor, etc.). In some embodiments, the electronic storage may be located in a server together with the processor, in a server that is part of the external resources, in the user interface devices, and/or in other locations. The electronic storage may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. The electronic storage may store software algorithms, information obtained and/or determined by the processor, information received via the user interface devices and/or other external computing systems, information received from the external resources, and/or other information that enables the system to function, as described herein.

Controller 10 may further comprise external resources. External resources of the system may include sources of information (e.g., databases, websites, etc.), external entities participating with the system, one or more servers outside of the system, a network, the electronic storage, equipment related to Wi-Fi technology, equipment related to BLUETOOTH® communications technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to the external resources may be provided by other components or resources included in the system. The processor, the external resources, the user interface device, the electronic storage, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

Controller 10 may further comprise user interface device(s). The user interface device(s) of the system may be configured to provide an interface between one or more users and the system. The user interface devices may be configured to provide information to and/or receive information from the one or more users. The user interface devices include a user interface and/or other components. The user interface may be and/or include a graphical user interface configured to present views and/or fields configured to receive entry and/or selection with respect to particular functionality of the system, and/or provide and/or receive other information. In some embodiments, the user interface of the user interface devices may include a plurality of separate interfaces associated with the processors and/or other components of the system. Examples of interface devices suitable for inclusion in the user interface device include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that the user interface devices include a removable storage interface. In this example, information may be loaded into the user interface devices from removable storage (e.g., a smart card, a flash drive, a removable disk) that enables users to customize the implementation of the user interface devices.

In some embodiments, the user interface devices may be configured to provide a user interface, processing capabilities, databases, and/or electronic storage to the system. As such, the user interface devices may include the processors, the electronic storage, the external resources, and/or other components of the system. In some embodiments, the user interface devices may be connected to a network (e.g., the Internet). In some embodiments, the user interface devices do not include the processor, the electronic storage, the external resources, and/or other components of the system, but instead communicate with these components via dedicated lines, a bus, a switch, network, or other communication means. The communication may be wireless or wired. In some embodiments, the user interface devices may be laptops, desktop computers, smartphones, tablet computers, and/or other user interface devices.

Data and content may be exchanged between the various components of the system through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

Controller 10 may further comprise a processor. In some embodiments, the processor may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, the processor is configured to provide information processing capabilities in the system. The processor may comprise one or more of a digital processor, an analog processor, a digital circuit designed to process information, an analog circuit designed to process information, a state machine, and/or other mechanisms for electronically processing information. Although the processor may be a single entity, this is for illustrative purposes only. In some embodiments, the processor may comprise a plurality of processing units. These processing units may be physically located within the same device (e.g., a server), or the processor may represent processing functionality of a plurality of devices operating in coordination (e.g., one or more servers, the user interface devices, devices that may be part of the external resources, the electronic storage, and/or other devices).

The following variables and parameters are used in the equations provided below. As used herein, the index t denotes a time period. I represents a set of transmission constraints; $i \in I$. J represents a set of resource units, such as a generating resource; $j \in J$. N represents nodes; $n_j \in N$ may be the node of unit j. The nodes may be configured into a topology based on current outage information and a network model. T represents time periods; $t \in T$. $B_{i,n,t}$ represents a sensitivity of the flow on transmission constraint i to injection at node n and withdrawal at the reference bus (e.g., busbar). This sensitivity may imply an impact on a constraint. $\overline{F}_{i,t}$ represents a line rating for transmission line i. The line rating may be the constraint limit, in MW. $RR_t$ represents a market-wide reserve requirement. This market-wide reserve requirement may be pre-determined by outage team/TSP. $R_{j,t}$ represents an available capacity of reserve on unit j. $\underline{SP}_{j,t}$ represents a unit j statistical minimum power output. $\overline{SP}_{j,t}$ represents a unit j statistical maximum power output. $P_{n,t}$ represents a net fixed injection at node n. $L_t$ represents an interval length of interval t, in minutes. This interval length may be the modeling interval.

$\overline{P}_{j,t}$ represents a unit j maximum power output. $\underline{P}_{j,t}$ represents a unit j minimum power output. $U_{j,t}$ represents a commitment decision of unit j. $U_{j,t}$ represents a unit j up ramp rate in megawatts per minute (MW/min.). $RD_{j,t}$ represents a unit j down ramp rate in MW/min. $BR_{z,m,t}$ represents a binary constraints requirements for load pocket z. $DT_j$ represents a minimum down-time of unit j. $C_{j,t}^P(\cdot)$ represents an energy offer cost function of $p_{j,t}$ from unit j, in a currency (e.g., $). $C_{j,t}^{NL}$ represents a no-load cost of unit j, in $. $C_{j,t}^{SU}$ represents a startup cost of unit j, in the currency. $\overline{F}_{i,t}$ represents a line rating for transmission line i. $RR_t$ represents a market-wide reserve requirement. $R_{j,t}^{DA}$ represents a day-ahead market cleared reserve of unit j. $O_{j,t}$ represents a resource j available reserve offer price, in $/MWh. $P_{j,t}^{DA}$ represents a day-ahead market cleared energy of unit j. $U_{j,t}^{DA}$ represents a day-ahead market commitment decision of unit j. $UT_j$ represents a minimum up-time of unit j. $V_{j,t}^{DA}$ represents a day-ahead market start-up decision from for unit j. $f_{i,t}$ represents a power flow on transmission line i. $p_{j,t}$ represents a cleared energy on unit j. $r_{j,t}$ represents a cleared reserve on unit j. The optimization engine may find the optimal energy and reserve clearing to minimize the operational cost. $u_{j,t}$ represents a commitment variable for unit j. This commitment variable my represent on/off status for generating units. $v_{j,t}$ represents a start-up variable for unit j. $w_{j,t}$ represents a shut-down variable for unit j. $\lambda_t$ represents a shadow price of power balance equation. $\mu_{i,t}$ represents a shadow prices of transmission constraint i. $\gamma_t$ represents a shadow price of reserve requirement constraint. $LMP_{n,t}$ represents a locational marginal price at node n. $MCP_t$ represents a market clearing price for reserve.

Presently disclosed are ways of managing watchlist constraints on an electric power grid, which may be performed by a controller that administers the market for electricity producers and users on an electric power grid. A constraint may be one or more resources called on by an operator or controller for managing congestion. The disclosed method may include performing power grid coordination calculations (e.g., including one or more of the calculations disclosed below as part of steps one, two, and/or three) and managing the coordination calculations. The managing may include a first step of coarse screening of the constraints, a second step of deterministic fine screening of the constraints, and a third step of statistical fine screening of the constraints.

In some embodiments, the fine screening step may follow the coarse screening step. Alternatively, or in addition, the coarse screening step may identify non-binding constraints based on maximum or minimum flow on a constraint. The optimization engine may determine whether a constraint is binding. If a constraint limit is not in the range of minimum and maximum flow on a constraint, it is a theoretically non-binding constraint, which implies redundancy. Alternatively, or in addition, the deterministic fine screening step may identify constraints that are redundant and/or dominated by other constraints. The herein-described constraints are called security constraints. They are typically transmission bottlenecks with the consideration of N−1 transmission asset contingencies. The transmission bottlenecks may include thermal constraints, market to market constraints, generic constraints, and/or market to non-market constraints. Voltage constraints may not be directly modeled in the market. To exemplify the mentioned dominance, x>=2 may always dominate x>=1 because any number x satisfying x>=2 will always satisfy x>=1 (not the other way around).

Alternatively, or in addition, the statistical fine screening step may identify lazy constraints. If a constraint has a probability of 10% or lower to be binding, the constraint can be identified as lazy constraint. Lazy constraints may not be initially modeled; however, they may be added back to the model if violated.

In some embodiments, a three-step pre-screening of security constraints may be performed. For example, an outage team may generate security constraints by performing AC flow study with a goal, e.g., to remove all the redundant security constraints to speed up DAM performance. Coarse screening may not contain as much details as fine screening, e.g., a full set of watchlist constraints. Fine tuning may take more time to perform.

A large number of security constraints may slow down the security constraint unit commitment (SCUC) computational performance. For example, in SCUC, only about 20% of constraints may be binding, and it may be proved that a significant number of constraints may be impossible to bind in SCUC. If a constraint limit is not in the range of minimum and maximum flow on a constraint, it may theoretically be a non-binding constraint, which implies redundancy.

SCUC may be defined as an algorithm capable of committing resources to supply energy and/or operating reserve on a co-optimized basis that minimizes capacity costs, while enforcing multiple security constraints. Based on the possible SCUC results, the day-ahead generators may status determine to satisfy the load demand. The goal of the SCUC issue may be to supply the needed energy, while the cost is minimized and the constraints associated with the problem are satisfied. Hence, the output of the SCUC problem may be an ON or OFF status of generation units and also their hourly generation amount. Therefore, the status of generation units and hourly economic dispatch may be associated with two concerns that may be determined simultaneously.

In a first step, power flow on each constraint i may be maximized, without considering the rest of constraints. A power flow may be maximized, when a power balance is met. Merit of order generation dispatch may be deployed based on the value of $B_{i,n_j,t}$. A unit with the largest $B_{i,n_j,t}$ may be deployed first. To minimize the flow on the constraint i, a unit with the smallest $B_{i,n_j,t}$ may be deployed first. Therefore, constraints that satisfy the two conditions below may be removed from the watchlist constraints set, For positive flow direction $$\Sigma_{q=1}^{m-1} p_{q,t} \leq \Sigma_{n \in N}(P_{n,t}) \leq \Sigma_{q=1}^{m} p_{q,t}$$

$$\Sigma_{q=1}^{m-1} p_{q,t} B_{i,n_q,t} + \Sigma_{n \in N}\{P_{n,t} B_{i,n,t}\} \leq \overline{F}_{i,t}$$

For negative flow direction $$\Sigma_{q=1}^{m-1} p_{q,t} \leq \Sigma_{n \in N}(P_{n,t}) \leq \Sigma_{q=1}^{m} p_{q,t}$$

$$-\overline{F}_{i,t} \leq \Sigma_{q=1}^{m-1} p_{q,t} B_{i,n_q,t} + \Sigma_{n \in N}\{P_{n,t} B_{i,n,t}\} \quad (20)$$

1 ... m may be the merit of order based on the value of $B_{i,n_j,t}$.

In a second step, power flow on each remaining constraint may be maximized from step 1, with considering the rest of constraints.

max or min $f_{i,t}$;
Power balance equation without losses ($\lambda_t$)

$$\Sigma_{j \in J}(p_{j,t}) - \Sigma_{n \in N}(P_{n,t}) = 0, \forall t$$

$$f_{i,t} = \Sigma_{j \in J}\{p_{j,t} B_{i,n_j,t}\} + \Sigma_{n \in N}\{P_{n,t} B_{i,n,t}\} \forall i,t$$

Reserve requirement ($\gamma_t$)

$$\Sigma_{j \in J} r_{j,t} \geq RR_t, \forall t$$

Resource limit constraints $$p_{j,t} + r_{j,t} \leq U_{j,t} \overline{P}_{j,t}, \forall j,t$$

$$p_{j,t} - r_{j,t} \geq U_{j,t} \underline{P}_{j,t}, \forall j,t$$

Resource ramp constraints $$-U_{j,t} L_t RD_{j,t} \leq p_{j,t} - p_{j,t-1} \leq U_{j,t} L_t RU_{j,t}, \forall j,t$$

$$0 \leq r_{j,t} \leq \overline{R}_{j,t}, \forall j,t$$

if $-\overline{F}_{i,t} \leq f_{i,t} \leq \overline{F}_{i,t}$, then the constraint may be identified as redundant.

In a third step, power flow on each remaining constraint may be maximized from step 1, with considering the rest of constraints and statistical range of power generation.

max or min $f_{i,t}$;
Power balance equation without losses ($\lambda_t$)

$$\Sigma_{j \in J}(p_{j,t}) - \Sigma_{n \in N}(P_{n,t}) = 0, \forall t$$

$$f_{i,t} = \Sigma_{j \in J}\{p_{j,t} B_{i,n_j,t}\} + \Sigma_{n \in N}\{P_{n,t} B_{i,n,t}\} \forall i,t$$

Reserve requirement ($\gamma_t$)

$$\Sigma_{j \in J} r_{j,t} \geq RR_t, \forall t$$

Resource limit constraints $$p_{j,t} + r_{j,t} \leq U_{j,t} \overline{P}_{j,t}, \forall j,t$$

$$p_{j,t} - r_{j,t} \geq U_{j,t} \underline{P}_{j,t}, \forall j,t$$

$$p_{j,t} + r_{j,t} \leq U_{j,t} \overline{SP}_{j,t}, \forall j,t$$

$p_{j,t} - r_{j,t} \geq U_{j,t}, \forall j, t$, where $\underline{SP}_{j,t}$ and $\overline{SP}_{j,t}$ are the statistical lower and upper bounds for the power generation Resource ramp constraints $$-U_{j,t} L_t RD_{j,t} \leq p_{j,t} - p_{j,t-1} \leq U_{j,t} L_t RU_{j,t}, \forall j,t$$

$$0 \leq r_{j,t} \leq \overline{R}_{j,t}, \forall j,t$$

if $-\overline{F}_{i,t} \leq f_{i,t} \leq \overline{F}_{i,t}$, then the constraint may be identified as lazy constraints. Based on historical data, a generator's output may be determined to be p−delta, p+delta, p being the output from MTLF model and delta being the power deviation between MTLF model and DAM.

Some aspects of the outage coordination process will now be described. For example, an overview of exemplary outage operation is provided. Controller 10 may be responsible for approving the scheduling of maintenance on all transmission facilities making up the transmission system and for coordinating with generator owners, as appropriate, to schedule maintenance on generation facilities. Outages of transmission facilities may affect the overall transfer capability of the grid. In some embodiments, an outage coordination (OC) team may: ensure that the grid remains reliable during planned outage conditions; ensure that the outages are accommodated within established reliability standards; and/or ensure that the energy markets have necessary information to run as efficiently as possible.

Some aspects of an exemplary outage coordination process will now be described. In FIG. 1, a process for facilitating outage coordination is shown. Transmission operators or generation operators may submit outage requests into outage scheduling system (CROW). Controller 10's OC may analyze and respond to outage requests submitted to controller 10's outage scheduler, within a period of time determined by the lead-time of the request. The OC team may perform power flow analysis, including one or more of N−1 contingency analysis, transfer studies, voltage and transient stability studies, scenario studies for areas with impacts from wind or load or pump storage issues. The power flow of a constraint may depend on the combination of injected/withdrawn power on different network nodes. Different combinations of power injection may lead to different power flows. Maximum and minimum flows on a constraint may define the power flow range of a constraint, which may be calculated based on possible nodal injection range. The OC team may evaluate the impact of outage on the bulk electric system (BES), considering possible system conditions. If analysis results of the outage in study are N−1 acceptable, the outage request may be approved in control room operation window (CROW). If a constraint violation exists, a mitigation plan, such as re-dispatch, may be developed. If a mitigation plan is available, the studied outage may be approved in CROW; otherwise, the studied outage may get denied in CROW.

Figure 2:
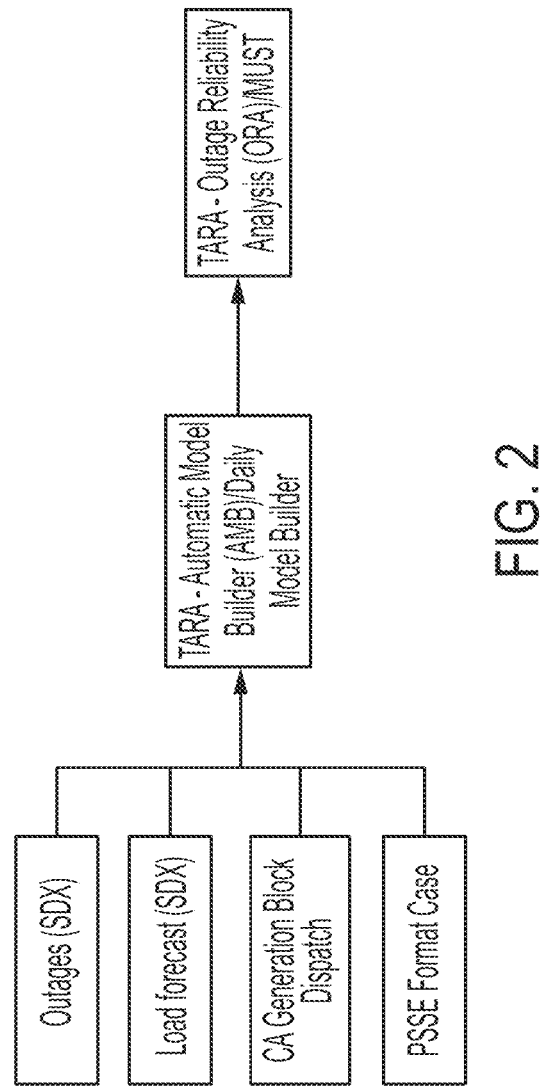
FIG. 2 illustrates a process for building a model and for analyzing power flow, in accordance with one or more embodiments.

Outage coordination may provide T-notes/Op guides to a transmission security planning (TSP) team for evaluation. TSP may add additional outage-driven constraints to the DAMS report if any violation is found. The DAM may be a voluntary and financially binding market that co-optimizes. Some aspects of exemplary outage coordination tools will now be described. In FIG. 2, an exemplary process for building a model and for analyzing power flow is shown. For example, an analyzed power flow may be an AC flow study. The model building tools may use North American Electric Reliability Corporation (NERC) system data exchange (SDX) files (e.g., load forecast and outage information), contingency generation block dispatch, and/or a power system simulator for engineering (PSSE) format starting point base case, as inputs to build a model for power flow and N−1 analysis. Outage information may be used to perform this N−1 analysis. Outage information may be very important to such study. Transmission asset outages may impact the topology of an electricity network, and they may impact the result of the study. With the TSP model, an outage team may use outage analysis tools to perform N−1 analysis.

Some aspects of model building tools will now be described. For example, there may be two model building tools used in an OC process. In some implementations, this tool may be used irregularly, on-demand, or periodically (e.g., on a weekly basis).

Some aspects of an exemplary TARA-AMB (automated model builder) will now be described. TARA-AMB may be used to build 6 months out daily peak (e.g., peak load of the study day) cases. These cases may be used for long lead time outage pre-screening, to identify congestion and outage conflicts ahead of time, and for timely outage request response. Transmission congestion may happen when power flow on a constraint reaches or exceeds a constraint limit. Transmission congestion may prohibit locational demands having access to economic power. To mitigate congestion, solutions may include re-dispatch of existing generation, adjustment of interchanges, commitment of new generators, load shedding, and/or another solution.

Some aspects of an exemplary daily model builder (model) will now be described. This tool may be used to build mainly 30 days out daily peak (e.g., peak load of the study day) cases in PSSE format. These cases may be used for detailed outage analysis using outage analysis tools. This tool may be used on a daily basis.

Some aspects of exemplary outage analysis tools will now be described. The daily peak cases built from the model building tools may perform N−1 analysis using such tools as TOST (MUST) and TARA-ORA. The TOST tool may be used for DC contingency analysis. And the TARA-ORA tool may perform DC contingency analysis with AC screening.

If there is any violation from the N−1 analysis, a mitigation plan may be developed with T-note/Op guides. T-note/Op guides may be passed to TSP team as input data.

Some aspects of exemplary transmission security planning will now be described. For example, a goal of transmission security planning is provided. Transmission security planning (TSP) may be responsible for: assessing the reliability of controller 10's transmission system based on latest system conditions; and providing controller 10's day-ahead (DA) and forward reliability assessment and commitment (FRAC) necessary inputs. Conditions may include load forecasting, interchanges, generators availability, and/or another condition. These inputs may include reserve requirements, load pocket study, watchlist constraints, etc.

A TSP study may aim to examine whether the planned operations for the next day within controller 10's and neighboring systems may exceed any system operating limits (SOL) or interconnection reliability operating limits (IROL), with the consideration of normal condition and contingency events. The TSP engineer may coordinate and work with transmission owners (TOs), transmission operators (TOPs), controller 10's real-time/forward market processes, controller 10's outage coordination, and/or, when necessary, neighboring reliability coordinators (RCs) to develop and help implement re-dispatch/binding, operating processes, procedures, or plans to prevent or mitigate an instance of exceeding an SOL or IROL. TSP engineers may collect OC analysis results, validate them, and/or incorporate them into a DAMS database. The TSP process and result postings may be performed to meet or exceed the applicable compliance requirements of NERC reliability standards IRO-008-2 and IRO-009-2.

Figure 3:
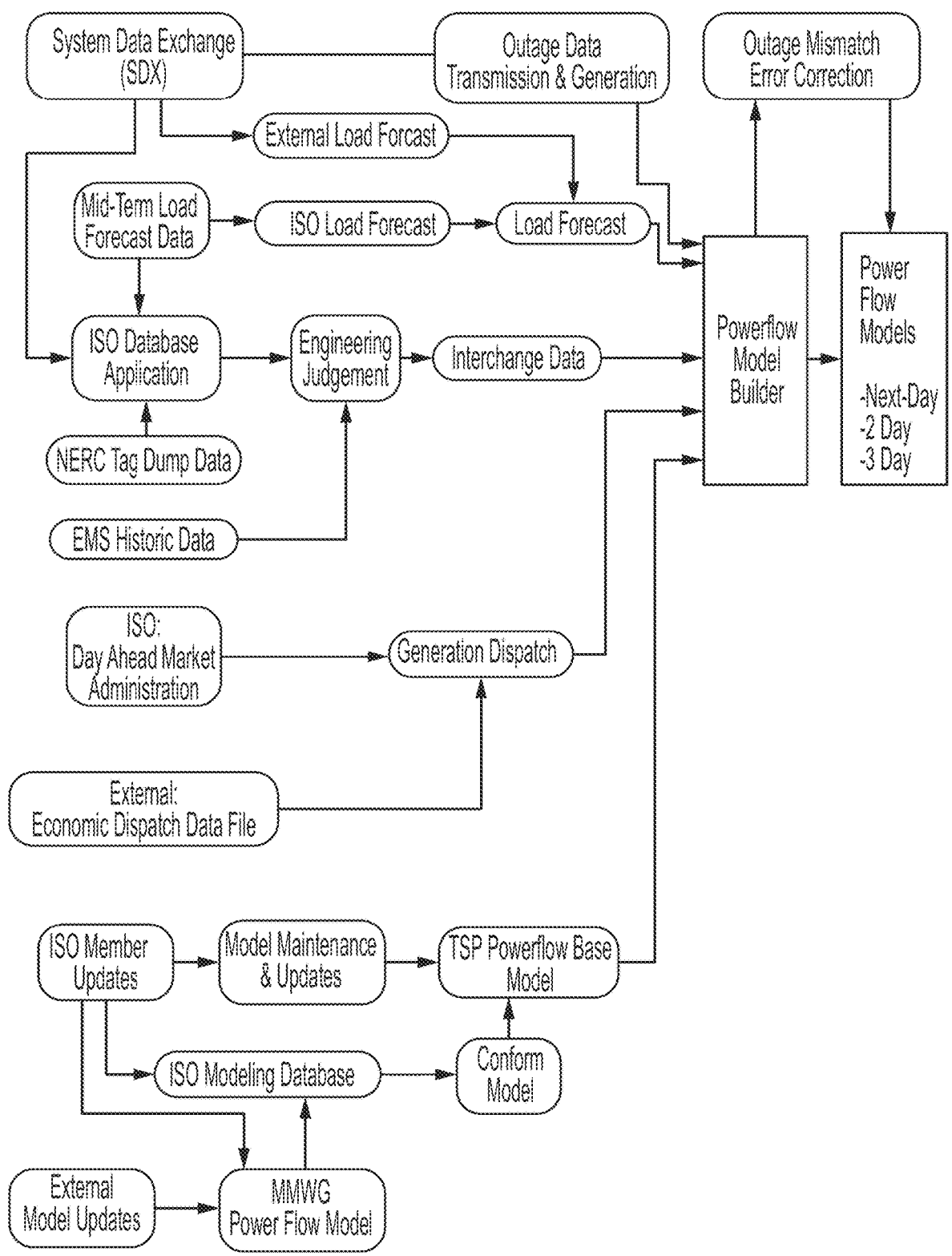
FIG. 3 illustrates a process for building a transmission security planning (TSP) model, in accordance with one or more embodiments.

Some aspects of an exemplary transmission security planning process will now be described. TSP processes may be performed three days, two days, and one day ahead of the operating day (OD). The TSP processes may build the TSP model to perform AC contingency analysis. The TSP may include the information of outage schedules, FRAC/DA commitment, topology information, and/or load and wind forecasts. FIG. 3 may show a process for building a TSP model. A python-based case builder tool may take information from SDX, generation and transmission outages, load and wind forecast, economic commitment information from DA/FRAC team, and interchange information. This information may be taken according to user selected day and hour and applied to the TSP base PSSE case. TSP base case may be the MOD based seed case to the case builder with all model updates applied, e.g., from members and external entities of controller 10. Once case building is complete, TSP engineers may review the case for missing outages and apply engineering judgement to make the case reflect real time system conditions.

TSP processes may be divided among two shift engineers, e.g., where a morning engineer works from 6 AM to 6 PM and where a night engineer works from 12 pm to 12 am. The morning engineer may be responsible for OD+1 model building and analysis. And the night engineer may be responsible for OD+2 and OD+3 model building and analysis. Table 1 shows a TSP daily worksheet comparison of morning/day and night shifts. The night shift engineer may perform studies for the two days study, and the night TSP model may employ FRAC commitment and historic interchange to perform the AC flow analysis with N−1 study. If new constraints beyond outage constraints are identified with violations, these new constraints may be added to the congestion management tool (CMT). CMT may output the constraints as temporary constraints, manual constraints, and standing constraints to a day-ahead market and reliability assessment (DAMS) report. Voltage collapse, frequency excursion, transmission violation, etc. are examples of unreliability.

A DAMS report may store and maintain reliability criteria and constraint information. Temporary constraints may include the OC constraints and additional TSP outage-driven constraints. Standing constraints may be the non-outage constraints. Those may be consistently identified by TSP, and the new non-outage constraints may be added as manual constraints. Apart from N−1 AC analysis, a night engineer may conduct further analysis to determine the minimum contingency reserve zone requirements for the ancillary services market (ASM) (BPM-002 energy and operating reserve markets). The morning shift engineer may perform a similar study as night shift but for the one day study. Other responsibilities of a morning engineer may include load pocket analysis, SSR studies, and assistance in DA and RT processes.

TABLE 1

| DAY SHIFT | NIGHT SHIFT |
|---|---|
| Review T-notes, outages, and data for OD + 1 | Review T-notes, outages and data for OD + 2 and OD + 3 |
| Run load pocket analysis | Run ASM reserve zone study |
| Run SSR study | N/A |
| Perform model building for OD + 1 | Perform model building for OD + 2 and OD + 3 |
| Perform N-1 AC analysis for OD + 1 | Perform N-1 AC analysis for OD + 2 and DC Analysis for OD + 3 |
| Post analysis results on common drive and extranet | Post analysis results on common drive |
| Review binding constraints from real time | Constraints identified for OD + 2 may go to DA engine |
| N/A | Perform model updates on base case |
| Uses DA commitments in case building | Uses FRAC commitments in case building |

Some aspects of exemplary transmission security planning tools will now be described. For example, transmission adequacy and reliability assessment (TARA) is described. TARA may be a steady-state power flow software tool with modeling capabilities and analytical applications that extend beyond traditional power flow solution. TARA may use linear (DC) and non-linear (AC) power flow calculations, and it also may integrate data checking, N−1 or N−1−1 analysis, transfer limit calculations, preventive and corrective dispatch, critical facility identification, reactive analysis, outage analysis, model building, and/or reserve requirement analysis. Direct current (DC) may be an approximation of alternating current (AC) power flow. TARA may take daily PSSE raw case and .mon .con files to run N−1 DC and AC analysis and provide thermal and voltage constraints.

Some advantages of TARA may include high performance analysis, unique analysis components not found anywhere else, mature user-friendly (Microsoft) Excel user interface, reporting and many right mouse click context based functions, built-in batch mode automation for running and comparing results of multiple analysis scenarios, and/or scriptable for automated processes that may run outside of Excel. Some TARA add-ons may include security-constrained dispatch (SCD), automated model builder (AMB), and/or outage reliability analysis (ORA).

Some aspects of an exemplary TSP model builder will now be described. Case builder may be implemented using a Python-based tool and used to build PSSE case for particular day and hour. This tool may take information from SDX, forecast, interchange information, and dispatch information from FRAC/DA files, outages to build the case. The tool may have options to choose peak or off peak hour case. More information is discussed above with respect to the TSP process, i.e., for a process flow in TSP model builder.

Some aspects of exemplary security constraint re-dispatch will now be described. Security constraint re-dispatch (SCD) may be a feature in TARA used to re-dispatch online generation in the case to solve identified thermal constraints.

Some aspects of an exemplary day-ahead market will now be described. For example, a goal of a day-ahead market is provided. Day-ahead market may be a financial market, where market participants may purchase and sell electric energy at day-ahead prices. A day-ahead market team may aim to: minimize the operating cost while meeting the reliability and physical constraints; recognize, monitor, and mitigate forecasted transmission constraints; and ensure efficient and reliable commitment for power system.

A DA team may need to gather participant bid/offer data, capture system topology, and/or controller 10's external energy transfers. The day-ahead market may clear supply offers and demand bids. After a day-ahead market closes, the DA team may need to publish and send unit commitment schedules, cleared energy schedules, and/or locational marginal prices.

Some aspects of an exemplary day-ahead market process will now be described. A day-ahead market operator may first build DA case flat files. Building a DA case may include drawing related market data from a database. A flat file is a database store in a file. A mid-term load forecasting (MTLF) DA case with market data from last day may be solved to help DA operators understand the market impacts of watch-list constraints and to verify if any constraints limits need to be adjusted. MTLF refers to the load forecasts before DAM, and there are short-term and long-term load forecasting, which are close to operational time or far from operational time, respectively. An MTLF DA case with market data from last day may be solved using the same RSC engine and any available data of the database. The mentioned market impacts may include dispatch and commitments of generating units, market clearing prices, and congestion status. After solving the MTLF DA case, if a constraint is associated with a contingency and the contingency is not active, the DA operator may activate the contingency. Before solving the DA market case, DA operators may need to perform congestion management, including activating constraints, de-activating constraints, and adjusting constraint targets.

With the entire DA data ready, the resource scheduling and commitment (RSC), which may be a security constraint unit commitment problem, may be solved to make commitment decisions for generating resources. A generating resource implies use of one or more generators. The commitment decisions may be input to scheduling, pricing, and dispatch (SPD), which may be a security constraint economic dispatch problem. SPD may more granularly model an energy offer curve and ramp rate. With the dispatch decision and virtual bidding clearing, a simultaneous feasibility test (SFT) may be performed to test if commitment and dispatch decisions satisfy N−1 reliability criteria. If there is any constraint violation, the associated constraint may be added to SPD to adjust dispatch. If a new constraint is added, dispatch solution may be adjusted accordingly to mitigate the new constraint. After solving the DA market, forward reliability assessment commitment (FRAC) may be used to evaluate the reliability of the market solution, and it may commit additional units if necessary. A generation unit may be a thermal power plant, renewable generators, etc.

Figure 4:
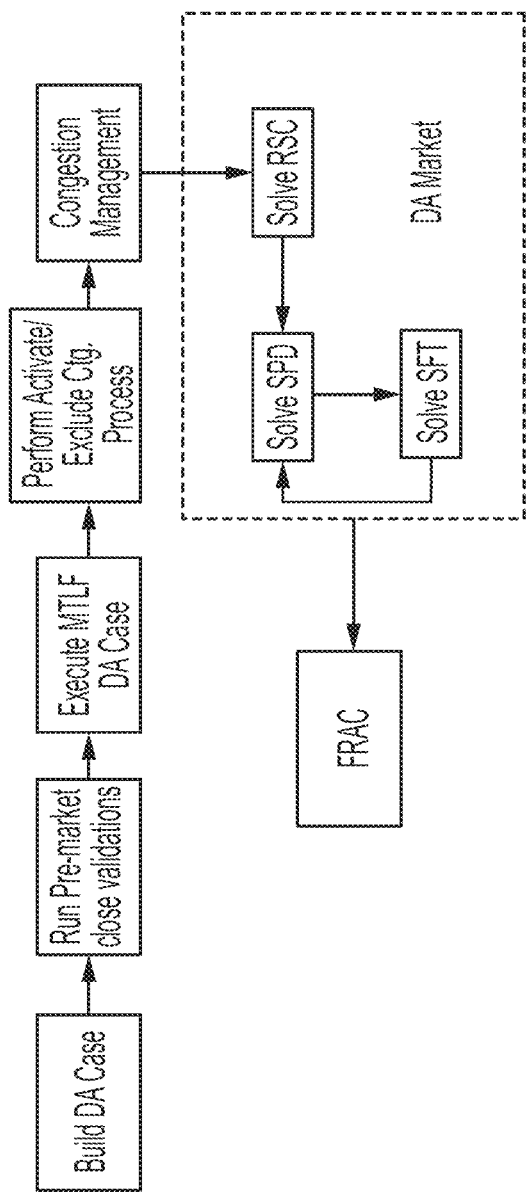
FIG. 4 illustrates an exemplary day-ahead (DA) market process, in accordance with one or more embodiments.

FIG. 4 illustrates an exemplary DA market process. Relating to the FRAC box of FIG. 4, a final result of this DA market process may include a forward reliability assessment commitment process (e.g., committing hydro and other long leading units).

Some aspects of exemplary day-ahead market tools will now be described. For example, a DAMRC constraint planner is provided. The constraint planner tool may be a visual basic for applications (VBA) based tool. The VBA tool's purpose may be to help make decisions on actions, which may better align the DA model with RT. When used in conjunction with other tools and processes, it may result in a much more effective and efficient constraint planning process.

The tool may search for any real-time bound constraint having RT/DA flow deviation excess of the given MW (e.g., default 20 MW), and it may identify the cause of target limit or topology differences based on real-time binding history (e.g., may be set as early as one month ago). By default, the tool may pull all constraints associated with upcoming outages starting a next market day, or any constraints added to DAMS report since yesterday for any outage to occur tomorrow. The tool may pull constraints associated with ongoing outages and that may continue to occur for the next market day. The constraint planner may provide recommendations for constraints in the DAMS report.

For example, the constraint planner with the tool may recommend removal of a constraint from the watchlist if: a TSP standing or observed constraint is determined invalid by a TSP engineer; an outage related constraint with the outage ending and valid for next market day; an outage related constraint with the outage no longer valid (i.e., outages completed, cancelled, revoked, recalled, withdrawn, or denied); and/or these conditions are met: the percentage of real-time binding hours is less than 25% of the outage period of an outage associated constraints or real-time binding hour is 0 for the last 365 for non-outage associated constraints; and the constraint is not associated with any other outage that occurs tomorrow.

In another example, the constraint planner may recommend adding a constraint to the watchlist. This constraint may be any constraint created by TSP since 00:00 yesterday for any ongoing outage, or any constraint associated with upcoming outages with a planned start date/time between 00:00 EST and 23:59 EST next market day may be recommended to be activated. The tool may check 1-year of real time binding history for each constraint, and it may sort them by outage ID and then by real-time binding hours. This added constraint may be any constraint that has not been bound in RT in the last 1-year period, and it may not be recommended for activation. The tool may always compare and pick the three most significant constraints per outage and recommend it to be activated. The tool may add a contingency override in the contingency tab, in EMD.

For any DAMS constraint (e.g., standing, TSP observed, or outage related) that is not recommended to be added to the watch list, or any watch list constraint that is recommended to be deactivated from watch list but listed as a valid DAMS constraints, a contingency validation check may be performed for the contingency associated with that constraint against three groups. That is, a first determination may be performed as to whether the contingency belongs to the current DARA contingency group and as to whether the contingency belongs to another watch list constraint. And a second determination may be performed as to whether the contingency is within the contingency tab (contingency overrides). And, further, a third determination may be performed as to whether it is included in contingency tab. If the contingency is not in any of these three groups, then the contingency (CTG) overrides column may recommend this contingency be added to contingency tab. If the contingency is in the contingency tab but excluded, then it may be recommended to include this contingency in the contingency tab (e.g., by unchecking the exclude checkbox); otherwise, the contingency may be already active, and no action may be needed. In another example, the constraint planner may recommend re-activating an existing contingency override.

In some embodiments, the tool may check and perform a contingency validation check, branch override check, and/or flow coefficient check and recommendations.

Some exemplary aspects of FRAME will now be described. The FRAME application in its current form may be used as a data reporting/analytic, which provides constraint planners a mechanism to look and verify constraint limits before the limits get used for DA cases. It also may provide information for FTR operators to validify constraint limits binding in FTR cases to DA limits. The FRAME application may be a web-based application, which may be accessible internally by controller 10.

The FRAME website may comprise one or more of the following sections: excessive congestion funding (ECF) summary, daily summary, ECF summary, DA constraint summary, and FTR summary. The ECF summary may include hourly details. For example, the hourly detail page may show constraint currently binding in real time for the current day. In another example, the hourly detail page may have constraint information, such as FGID, FG owner, constraint name, type, ECF, RT JOA payments, the controller SP, counter party SP, the controller FFE, counter party market flow, loop flows, DA commercial flows, and/or RT commercial flow. The daily summary may provide the same information as the hourly details page, the only difference being the hourly detail page may be grouped by RT binding hours whereas the daily page may be grouped by RT constraints. The ECF summary page may show the last seven days-worth of excess congestion funding data.

The DA constraint summary page may have the recommendation for DA operators to what limits they may put in for DA case. There may be three kinds of constraints that are modelled, as watchlist constraint in the DA market. Market to market (M2M) constraints may include internal M2M, external M2M, generic constraints, and/or market to non-market constraints. The internal M2M may be the controller owner of Flowgate. The external M2M may be the non-the controller owner of Flowgate. The real-time congestion funding (CF) target may be based on historical values for (e.g., the controller FFE, market bias (historical biased seen between DA/RT)). The generic constraints may include a real-time CF target based on historical values for RT limit (e.g., $80^{th}$ percentile), loop flow and/or par flow. The market to non-market constraints may include real time CF target based on historical values for RT limit (e.g., $80^{th}$ percentile), loop flow and/or par flow.

The FTR summary page may be mainly used by FTR operators/engineers to perform constraint analysis for FTR markets, and it may include a daily summary and/or a monthly summary.

Some aspects of an exemplary MTLF DA case will now be described. This study mode may address inherent problems in the day ahead steering case. For example, in order to be of value in presenting a view of the issues likely to be seen in the production case, the steering case may be executed early enough that a significant percentage of day-ahead demand bid is accounted for. The DA-MTLF study mode may allow the operators to run a steering case pointing to MTLF case rather than demand bid. DA-MTLF may be copied from a production case, but even after being copied from a production case the DA-MTLF case may not be approved or posted for market participants (MPs).

The number of watchlist constraints may be a main driver of slow computational performance. The prior selection of constraints may not be tailored to the need. Based on the historical observation, a considerable number of watchlist constraints may not be binding. Therefore, it may be desirable to more efficiently manage watchlist constraints and lower the computational complexity. There may be different ways of managing computational performance, including a number of variables, a number of constraints, better hardware, and better software (e.g., commercial optimization solvers). Lowering the number of constraints may be an cost-effective way of improving computational performance. The disclosed approach may accelerate computational speed by developing a more efficient and rigorous watchlist constraint determination process within a relatively near-term timeframe.

Some aspects of an exemplary forecast direction of power flow will now be described. Power flows may be bi-directional, and constraints may be enforced bi-directionally. However, in practice, it may be possible to forecast the direction of power flow for most of the constraints. Therefore, for the constraints of forecasted flow direction, only one side of the constraints may need to be enforced.

A day-ahead team may forecast the power flow direction based on the outage power flow study, TSP power flow study, and/or mid-term load forecasting (MTLF) case. More than 95% of the constraints' flow direction may be accurately forecasted. By removing one side of the transmission constraints, the density of the model matrix may be lowered and the solving time of SCUC may be sped up. For example, one direction of power flow may never exceed the constraint limit.

Some aspects of exemplary pre-screen watchlist constraints will now be described. A large number of security constraints may slow down the SCUC computational performance. In SCUC, only about 20% of constraints may be binding, and it may be proven that a significant number of constraints are impossible to bind in SCUC.

Two methods may be developed to pre-screen inactive constraints: identification of maximum constraint flow; and identification of dominated constraints.

Some aspects of exemplary identification of maximum constraint flow will now be described. The set of inactive constraints may be identified by solving mixed integer problems (MIP).

obj:

$$\min_{p_{j,t}, r_{j,t}, u_{j,t}} \sum_{j \in J, t \in T} \{(p_{j,t}) + C^{SU}_{j,t} v_{j,t} + C^{NL}_{j,t} u_{j,t} + O_{j,t} r_{j,t}\} \quad (1)$$

s.t.:

Power balance equation without losses ($\lambda_t$)

$$\Sigma_{j \in J}(p_{j,t}) - \Sigma_{n \in N}(P_{n,t}) = 0, \forall t \quad (2)$$

Transmission constraints ($\mu_{i,t}$)

$$-\overline{F}_{i,t} \leq f_{i,t} \leq \overline{F}_{i,t} \forall i,t \quad (3)$$

$$f_{i,t} = \Sigma_{j \in J}\{p_{j,t} B_{i,n_j,t}\} + \Sigma_{n \in N}\{P_{n,t} B_{i,n,t}\} \forall i,t \quad (4)$$

Reserve requirement ($\gamma_t$)

$$\Sigma\Sigma_{j \in J} r_{j,t} \geq RR_t, \forall t \quad (5)$$

Resource limit constraints $$p_{j,t} + \Sigma_{j \in J} r_{j,t} \leq u_{j,t} \overline{P}_{j,t} \forall j,t \quad (6)$$

$$p_{j,t} - r_{j,t} \geq u_{j,t} \underline{P}_{j,t} \forall j,t \quad (7)$$

Resource ramp constraints $$-u_{j,t} L_t RD_{j,t} \leq p_{j,t} - p_{j,t-1} \leq u_{j,t} L_t RU_{j,t}, \forall j,t \quad (8)$$

$$0 \leq r_{j,t} \leq \overline{R}_{j,t}, \forall j,t \quad (9)$$

Minimum up/down time constraints $$\Sigma_{s=t-UT_j+1}^{t} v_{j,s} \leq u_{j,t}, \forall j,t \quad (10)$$

$$\Sigma_{s=t-DT_j+1}^{t} w_{j,s} \leq 1 - u_{j,t}, \forall j,t \quad (11)$$

State transition constraints $$v_{j,t} - w_{j,t} = u_{j,t} - u_{j,t-1}, \forall j,t \quad (12)$$

To find out the maximum flow and minimum flow on a constraint k, a MIP problem as below may be formulated Problem 1

Objective $$\max \text{ or } \min f_{k,t} \quad (14)$$

s.t.:

(2), (4)-(12) and

Transmission constraints $$-\overline{F}_{i,t} \leq f_{i,t} \leq \overline{F}_{i,t}, \forall i \neq k, t \quad (15)$$

Problem 1 may solve the maximum/minimum flow on a constraint. If the maximum/minimum flow is within the transmission limit, the associated constraint may be redundant. However, it may not be less computationally complex than the SCUC problem. To make the pre-screening process more computationally manageable, some embodiments may relax problem 1. Relaxing a problem implies making the problem less constrained. In problem 2, all the commitments variables may be set to one and ramp rate constraints and minimum up/down constraints may be relaxed. Problem 2 may be formulated as below, Problem 2

Objective  (14)

s.t.:

(2), (4)-(5), (15)

Resource limit constraints $$p_{j,t} + \Sigma_{j \in J} r_{j,t} \leq \overline{P}_{j,t}, \forall j,t \quad (16)$$

$$p_{j,t} - r_{j,t} \geq \underline{P}_{j,t}, \forall j,t \quad (17)$$

Problem 2, which is a linear programing problem, may be easier to solve comparing with problem 1. However, for practical implementation, problem 2 may be still computationally intensive. To further lower the computational time, problem 2 may be further relaxed by removing transmission constraints (15) and reserve constraints (5) and reserve variables. Problem 3 may be formulated as below, Objective $$\max \text{ or } \min \Sigma_{i \in j}\{p_{j,t} B_{i,n_j,t}\} \quad (18)$$

s.t.:

(2) and

Resource limit constraints $$0 \leq p_{j,t} \leq \overline{P}_{j,t}, \forall j,t \quad (19)$$

To maximize the flow on the constraint i, merit of order generation dispatch may be deployed based on the value of $B_{i,n_j,t}$. A unit with the largest $B_{i,n_j,t}$ may be deployed first. To minimize the flow on the constraint i, a unit with the smallest $B_{i,n_j,t}$ may be deployed first. Therefore, those constraints that satisfy the two conditions below may be removed from the watchlist constraints set, For positive flow direction $$\Sigma_{q=1}^{m-1} p_{q,t} \leq \Sigma_{n \in N}(P_{n,t}) \leq \Sigma_{q=1}^{m} p_{q,t} \quad (20)$$

$$\Sigma_{q=1}^{m-1} p_{q,t} B_{i,n_q,t} + \Sigma_{n \in N}\{P_{n,t} B_{i,n,t}\} \leq \overline{F}_{i,t} \quad (21)$$

For negative flow direction $$\Sigma_{q=1}^{m-1} p_{q,t} \leq \Sigma_{n \in N}(P_{n,t}) \leq \Sigma_{q=1}^{m} p_{q,t} \quad (20)$$

$$-\overline{F}_{i,t} \leq \Sigma_{q=1}^{m-1} p_{q,t} B_{i,n_q,t} + \Sigma_{n \in N}\{P_{n,t} B_{i,n,t}\} \quad (21)$$

1 . . . m may be the merit of order based on the value of

However, virtual biddings may have significant impacts on the watchlist selection. There may be two types of virtual biddings in controller 10's market: incremental bids and decremental bids. Cleared virtual biddings may impact power injection and therefore impact constraint flow. The maximum power flow problem may become less effective if there is a significant number of virtuals in the market. Therefore, to make the pre-screening algorithm viable in the market clearing software, virtuals clearing should be treated properly with the consideration of the virtual economic offer. Virtuals clearing implies that virtuals may impact the market flow as well in DAM. So when calculating the maximum and minimum power flow, the disclosed approach may have to consider virtuals' impacts. Virtuals may be sensitive to the locational marginal prices in the day-ahead market. Based on historical market clearing prices data, LMP on each commercial node (CPnode) may be modeled as a range with a pre-determined confidence interval.

Some aspects of an exemplary two-step deterministic prescreening algorithm will now be described. For example, a two-step deterministic prescreening algorithm is disclosed to accelerate the redundant watchlist constraints identification performance by breaking the original problem into steps. Since problem 3 may be easy to solve without using optimization engine, therefore, step 1 may employ problem 3 to perform the coarse pre-screening. After step 1, step 2 may employ problem 4 to perform fine pre-screening to filter out constraints from the remaining group. Problem 4 may consider transmission constraints by comparing with problem 3, and this step may be used to identify remaining watchlist constraints that may be dominated by other watchlist constraints. Since problem 4 needs an optimization solver to solve, it may take more time to process than step 1. However, the purpose of step 2 may be to filter out dominated constraints and check if the maximum or minimum flow on a constraint may exceed its limit. Therefore, problem 4 may be reformulated as problem 5, which may be a feasibility problem. Problem 5 may indicate whether the flow on the monitored constraint exceeds its constraint limit and whether the monitored constraint is redundant and may be removed.

Problem 4
Objective: (18)
s.t.:
(2), (4), (15), and (19)
Problem 5
Objective: 0
s.t.:

$$\Sigma_{j \in J}\{p_{j,t} B_{i,n_j,t}\} \geq \overline{F}_{i,t} \text{ or } \Sigma_{j \in J}\{p_{j,t} B_{i,n_j,t}\} \geq -\overline{F}_{i,t} \quad (22)$$

(2), (4), (15), and (19)

Some aspects of an exemplary two-step statistical-based prescreening algorithm will now be described. For example, a two-step statistical-based prescreening algorithm may be proposed to prescreen watchlist constraints. In problems 4 and 5, if constraint (19) is tightened with lower and upper bounds, the prescreening algorithm may be more efficient, and the SCUC model size may be further reduced. A statistical model may be created and used to forecast generators output bound based on prior day generators information. The statistical model may process the historical unit output data by taking the difference of one day's data and its prior day. The processed data may be used for calculating the forecast error using prior day unit output. In an embodiment, the data only considers units above 50 MW capacity and non-zero value.

Figure 5:
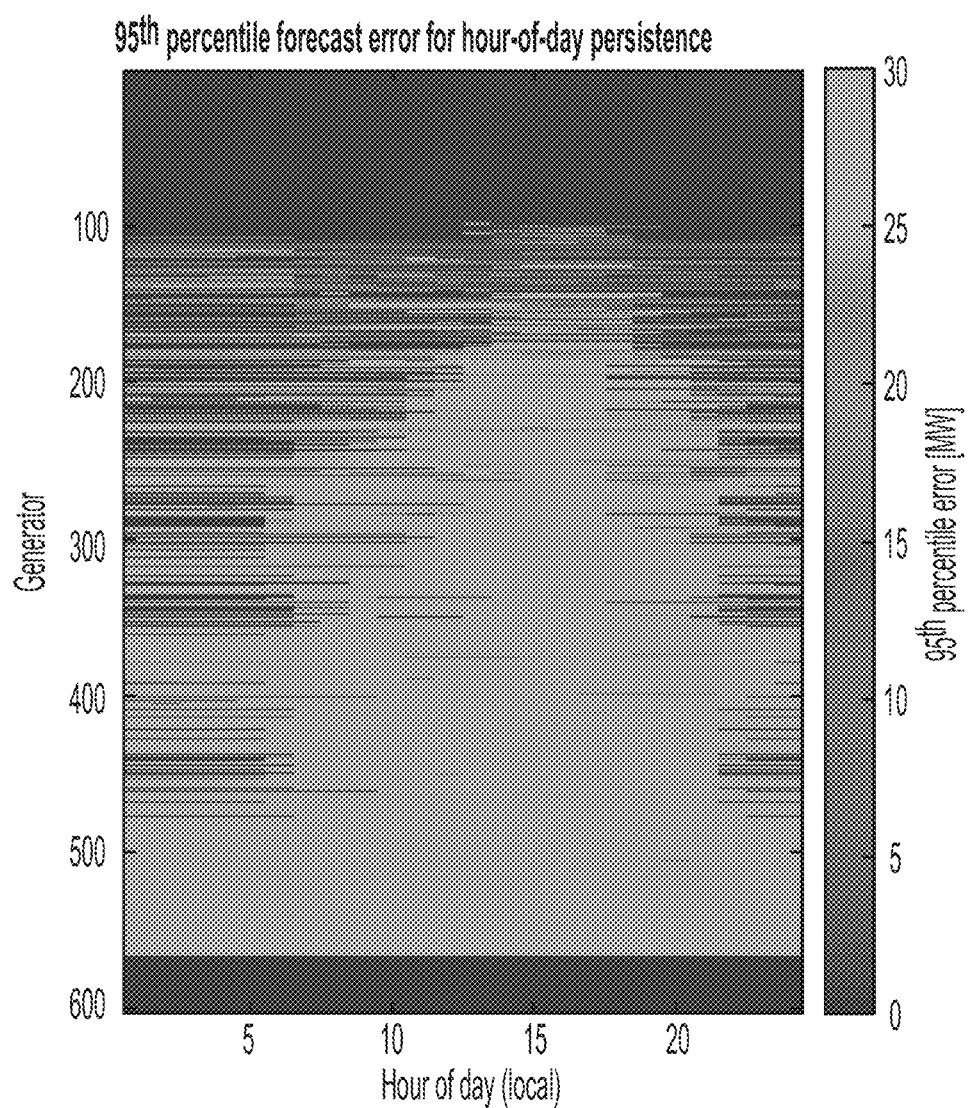
FIG. 5 illustrates a chart with $95^{th}$ percentile forecast error for hour of the day persistence, in accordance with one or more embodiments.

FIG. 5 illustrates an exemplary chart with 95$^{th}$ percentile forecast error for hour-of-the-day persistence, with the consideration of past three years data. Persistence implies how a difference of one generator's output one day may differ from its prior day. The y-axis of FIG. 5 is a generator identifier (ID). Different colors may represent different forecast error, from blue to yellow (e.g., 0 MW to 30 MW). The unit output range may be formulated as below, $$p_{j,t} + \Sigma_{j \in J} r_{j,t} \leq \min(\overline{P}_{j,t}, P_{j,t-24} + \Delta_{j,t}) \forall j, t \quad (23)$$

$$p_{j,t} - r_{j,t} \geq \max(\underline{P}_{j,t}, P_{j,t-24} + \Delta_{j,t}) \forall j, t \quad (24)$$

$P_{j,t-24}$ may be the prior day same hour unit output for unit j hour t and $\Delta_{j,t}$ may be the persistence forecasting error. The statistical two-step prescreening algorithm may employ problems 6 and 7. Step 1 may use problem 6 to perform coarse prescreening. $U_{j,t}$ may be the commitment from MTLF. The difference between problems 2 and 6 may be the statistical upper bound of resource limit constraints. Step 2 may use problem 7 to perform fine prescreening. Problem 7 may consider all remaining watchlist constraints and use statistical upper and lower bounds of the unit output. Step 2 may be used to find dominated watchlist constraints. If a constraint is dominated, the constraint may be identified as redundant. Step 2 may be a feasibility problem and infeasibility indicates the redundancy of the corresponding constraint.

Problem 6
Objective (14)
s.t.:
(2), (4)
Resource limit constraints $$p_{j,t} + \Sigma_{j \in J} r_{j,t} \leq U_{j,t} \min(\overline{P}_{j,t}, P_{j,t-24} + \Delta_{j,t}) \forall j, t \quad (25)$$

$$p_{j,t} - r_{j,t} \geq 0 \forall j, t \quad (26)$$

Problem 7
Objective 0
s.t.:
(2), (4), (15), (22), (25)
Resource limit constraints $$p_{j,t} - r_{j,t} \geq U_{j,t} \max(\underline{P}_{j,t}, P_{j,t-24} + \Delta_{j,t}) \forall j, t \quad (27)$$

Figure 6:
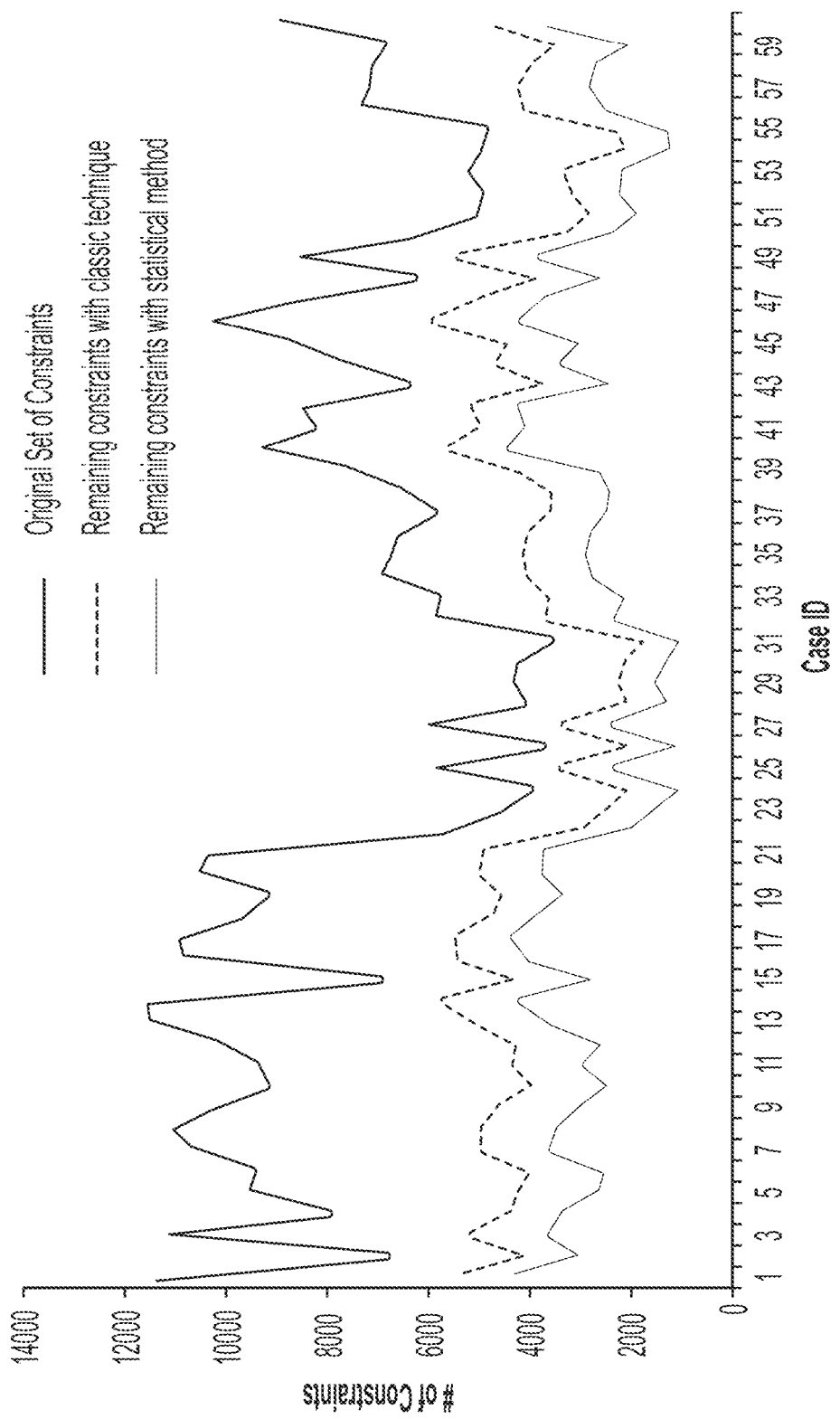
FIG. 6 illustrates a chart with results of a prescreening algorithm, in accordance with one or more embodiments.

FIG. 6 illustrates an exemplary chart with results of a prescreening algorithm, i.e., two-step deterministic prescreening method (classic, known) and two-step statistical-based prescreening method (statistical) for sixty test cases. The blue curve may represent the original number of constraints, the green curve may represent the remaining number of constraints with classic technique, and the red curve may represent the remaining number of constraints with statistical technique. From FIG. 6, the classic technique may significantly filter out the redundant constraints, and the statistical method may further remove additional constraints. The remaining constraints with statistical method may be a subset of the remaining constraints with classic technique. In Table 2, classic technique may filter out 49.21% of watchlist constraints, while the statistical method may filter out 64.58% of the watchlist constraints. Table 2 thus exemplary shows an average number of constraints remaining.

TABLE 2

|  | ORIGINAL | CLASSIC | STATISTICAL |
| --- | --- | --- | --- |
| Average Number of Constraints Remaining (60 Cases) | 7722 | 3942 | 2727 |
| Percentage of Constraints Removed | — | 49.21% | 64.68% |

Figure 7:
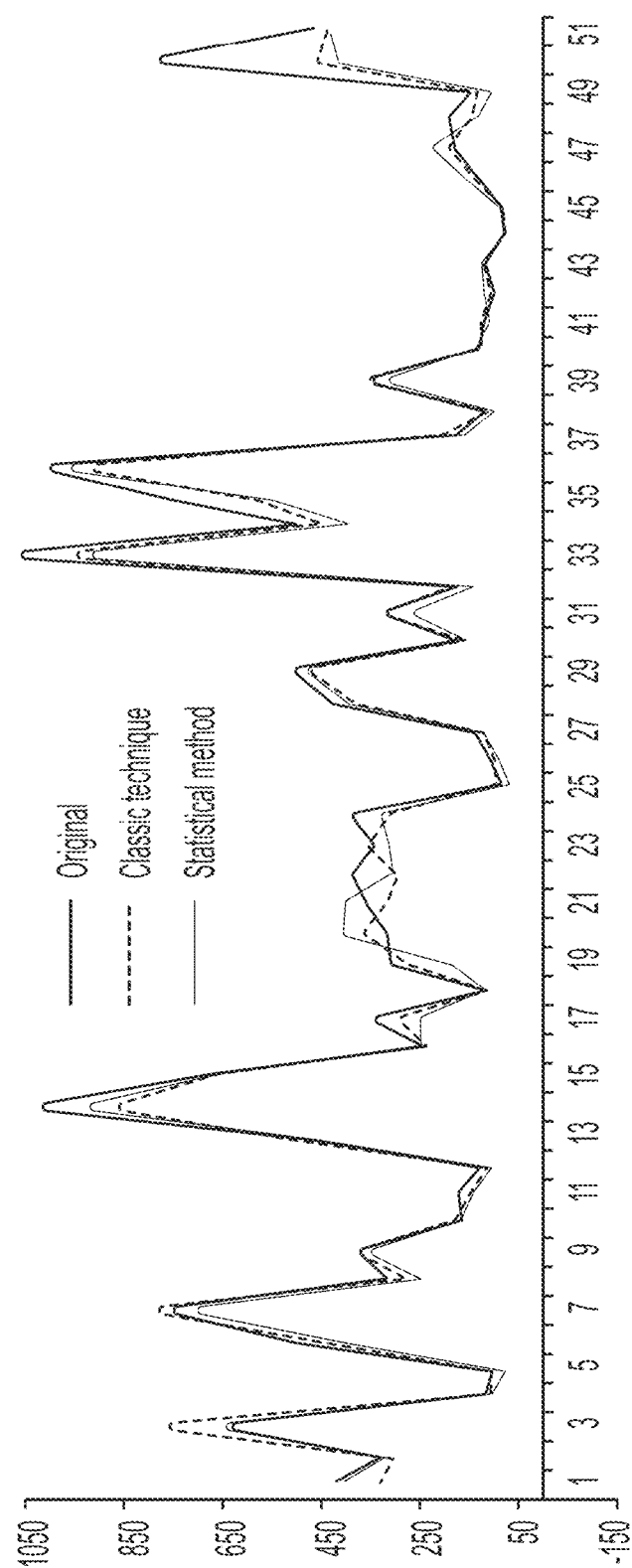
FIG. 7 illustrates a chart with computational performance for easy cases, in accordance with one or more embodiments.
Figure 8:
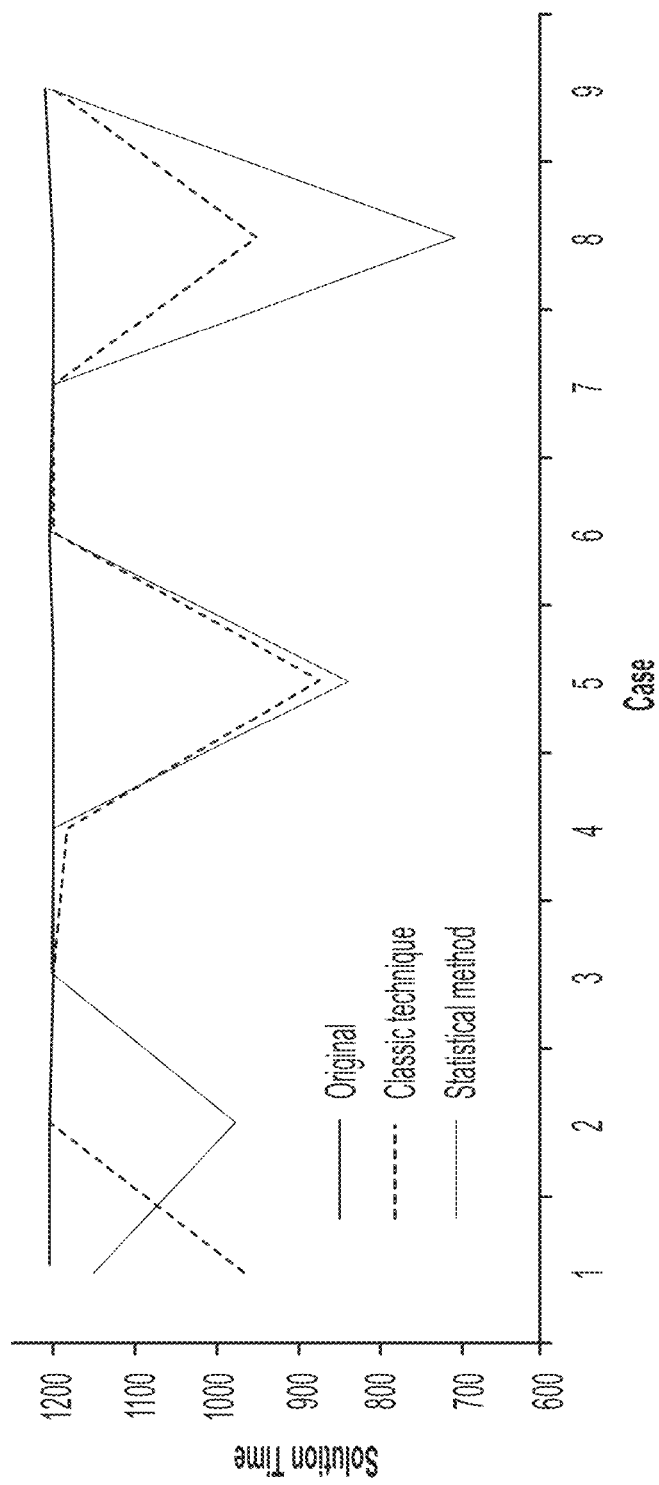
FIG. 8 illustrates a chart with computational performance for hard cases, in accordance with one or more embodiments.

Some aspects of exemplary computational performance with a prescreening technique will now be described. With more constraints filtered out, the SCUC problem size may become smaller. FIGS. 7-8 illustrate exemplary charts with resulting computational performance for easy and hard cases, respectively. The x-axis of FIG. 7 is easy case ID. The solution time on the y-axis of FIG. 8 is in seconds (s). In Table 3, the classic technique may reduce the computational time by 7.1% on average, and the statistical method may reduce the computational time by 8.6% on average. Table 3 thus exemplarily shows computational performance for easy cases. An easy case is differentiated from a hard case based on solving time and computational complexity.

TABLE 3

|  | ORIGINAL | CLASSIC | STATISTICAL |
| --- | --- | --- | --- |
| Average Solution Time | 463 | 430 | 423 |
| Percentage Improvement | — | 7.1% | 8.6% |

FIG. 8 shows the computational performance comparison for hard cases. If the original test case does not reach below 0.1% optimality gap within 1200 seconds, the test case may be defined as hard case. There may be five cases out of nine hard cases may reach below 0.1% optimality gap without 1200 seconds.

Some aspects of exemplary lazy constraints will now be described. Lazy constraints may be parameters in mathematical-optimization solvers GUROBI and CPLEX that may be identified as not binding to the solution. Linear constraints that are set as lazy may be placed in the lazy constraints pool. The lazy constraints may remain inactive until a feasible solution is found, and the feasible solution may be checked against the lazy constraint pool. Lazy constraints may not be explicitly modelled by the solver, and violated lazy constraints may be added to each node via callback function. It may be crucial to define a lazy constraints set. Lazy constraints may guarantee global optimality. If there are many lazy constraints violated, the solver may keep adding violated lazy constraints to the nodes, and this process may be computationally expensive. About 20% of the watchlist constraints may be binding in the day-ahead market and excluding non-binding constraints from the model may significantly simplify the model and thus reduce the solution time. A significant task may be how to define which constraints are lazy. It may be preferable to define constraints with lower probability to be binding as lazy constraints, while keep constraints with higher probability to be binding in the model. These probabilities refer to whether the constraint is binding in the optimal solution.

Figure 9:
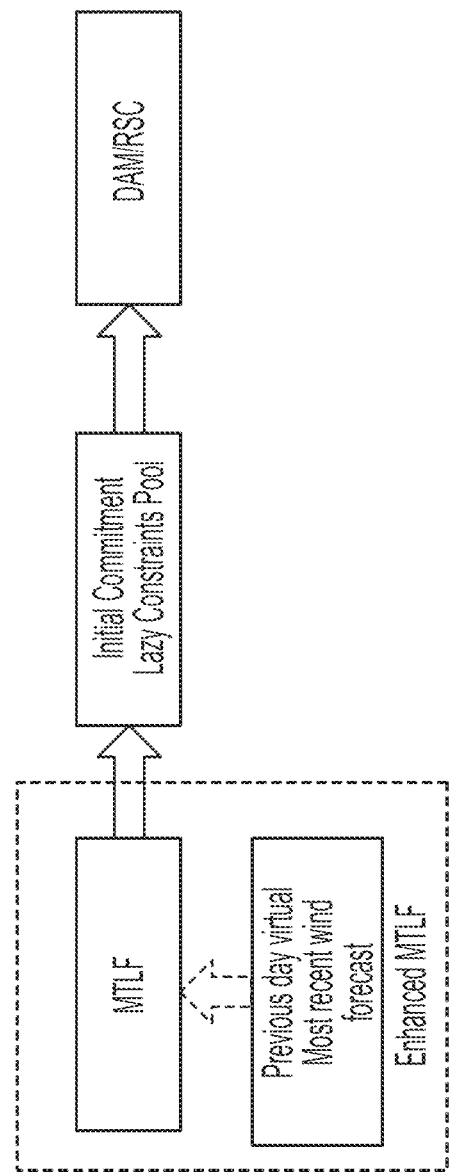
FIG. 9 illustrates a process for enhancing mid-term load forecasting (MTLF) and for setting lazy constraints, in accordance with one or more embodiments.

As discussed above with respect to the MTLF DA case, the MTLF model may be solved before solving day-ahead market. The MTLF case may use available energy/reserve/virtual offers from market participants. The day-ahead market may employ load bids in the optimization engine, while MTLF case employs mid-term load forecasting as fixed load. The MTLF case may solve load leveling for each constraint, and the information may be effectively used to identify lazy constraints in the day-ahead market. Therefore, improvement of MTLF model may improve the lazy constraints definition. As shown in FIG. 9, a better definition of lazy constraints may significantly reduce the computational solution time. FIG. 9 thus illustrates an exemplary process for enhancing MTLF and for setting lazy constraints. FIG. 9 shows a wind forecast as input into the MTLF box, this forecast being of only wind or it may additionally include solar energy. This figure further shows MTLF enhancement and lazy constraints setting of what should be labeled as lazy constraints in DAM.

Possible ways of improving MTLF cases include: (i) improving virtual offers in the MTLF (e.g., about 65% of the virtual bids in any day may not have changed from the previous day); (ii) improving energy/reserve offers (e.g., if energy/reserve offers are not available in the engine, default offers may be used and statistical analysis may be used to improve the convergence of default offers and true offers); and/or (iii) improving outage information (e.g., MTLF case does not consider some outages, which exist in the day-ahead market and using the most accurate outage information may help improve the accuracy of MTLF case).

Lazy constraints may be required for the model. For example, the model may be incorrect without these constraints. For some models, it may be helpful to designate some constraints as lazy, when it is computationally faster just to include them when they are violated. This may typically be for models that contain a relative large number of constraints, and where most are trivially satisfied. Lazy constraints may be used to eliminate integer solutions that may be otherwise feasible. That is, adding lazy constraints may affect the set of integer feasible solutions. Thus, in creating lazy constraints via a callback, some embodiments may cause a setting of the parameter LazyConstraint=1. Otherwise, GUROBI may potentially apply dual pre-solve reductions that may not be valid for the lazy constraints. When setting a LazyConstraint=1 parameter, without adding any lazy constraints, the algorithmic behavior of GUROBI may change (e.g., due to implicitly disabling dual pre-solve reductions), but the optimal objective value may not change. Lazy constraints may be linear constraints, and they may be semantically equivalent to standard linear constraints. Depending on their laziness level, they may be enforced differently by the MIP solver.

Figure 10:
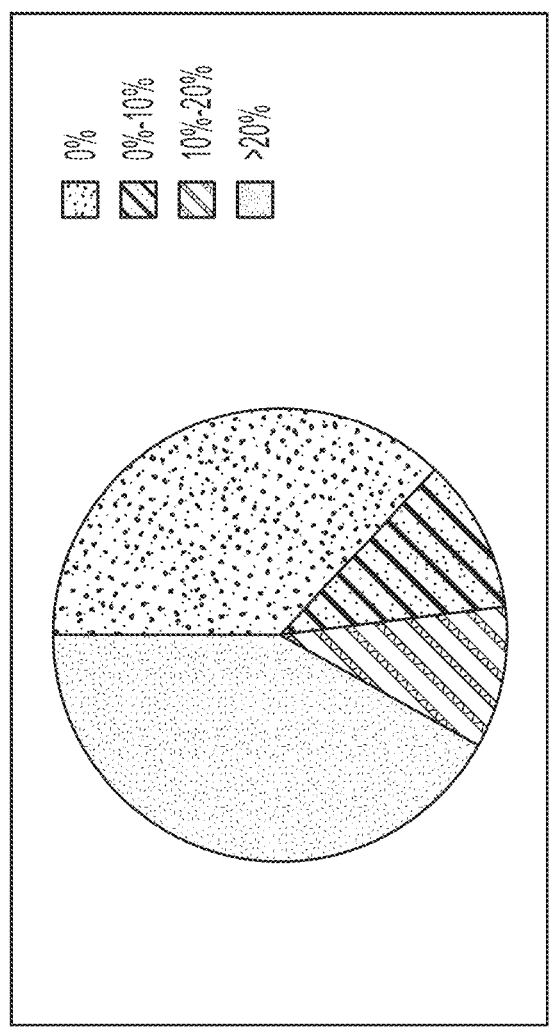
FIG. 10 illustrates a chart with virtuals biddings by changes in offer size and price, in accordance with one or more embodiments.

Some aspects of improving virtual offers will now be described. Virtual offers input of MTLF may be improved based on historical data. Based on the analysis of one year historical data, 37% of virtual biddings may have 0% change in their offer size and price, 11% of virtual biddings may have a 0% to 10% change in their offer size and price, and 10% of virtual biddings may have a 10% to 20% change in their offer size and price, and 42% of virtual biddings may have more than a 20% change in the offer size and price. The percentage of virtual biddings by changes in offer size and price is exemplarily demonstrated in FIG. 10. FIG. 10 thus illustrates an exemplary chart with virtual biddings by changes in offer size and price.

Figure 11:
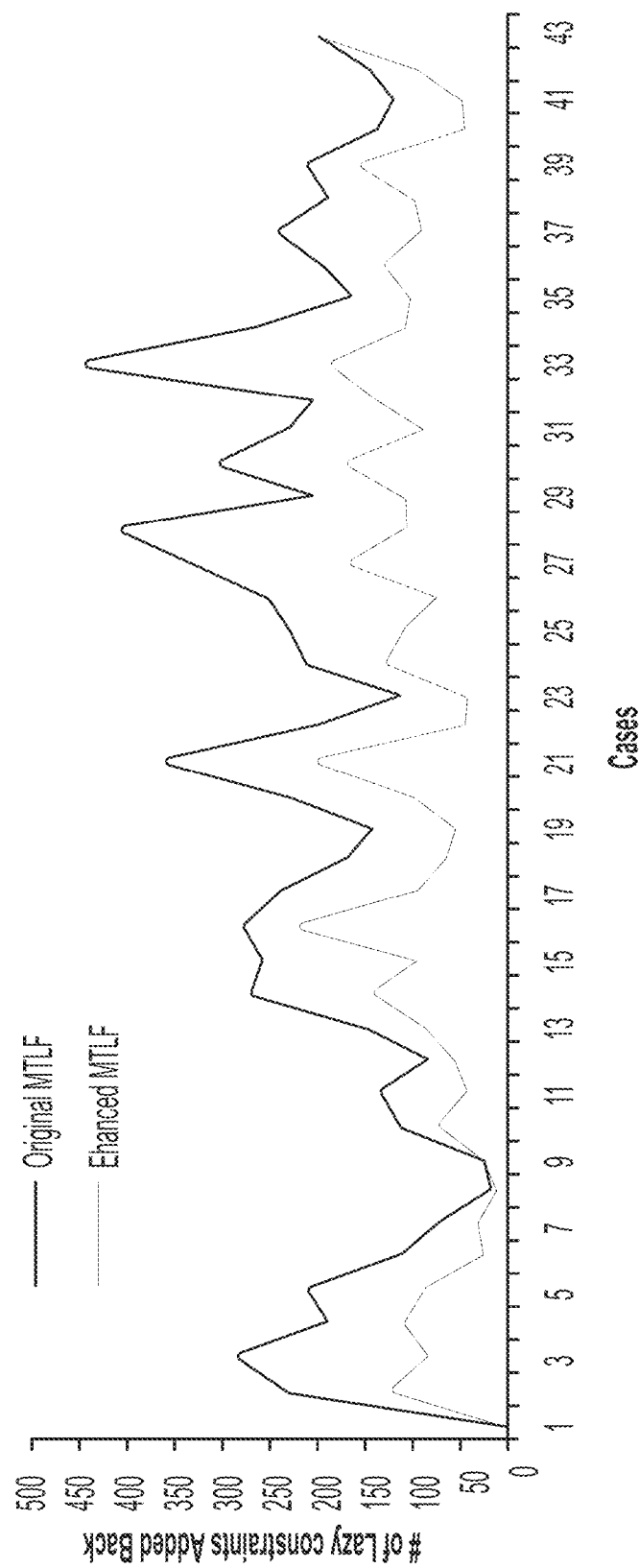
FIG. 11 illustrates a chart with a number of lazy constraints added back to a model by CPLEX, in accordance with one or more embodiments.

By improving an MTLF model, a better lazy constraints pool may be defined, and fewer lazy constraints may be expected to be added back to the model. From FIG. 11, the number of lazy constraints added back to the model of enhanced MTLF may be significantly reduced, when comparing with an original MTLF. FIG. 11 illustrates an exemplary chart with a number of lazy constraints added back to a model by CPLEX. Lazy constraints may remain inactive until a feasible solution is found, at which point the solution may be checked against the lazy constraint pool. If the solution violates any lazy constraints, the solution may be discarded and one or more of the violated lazy constraints may be pulled into the active model.

Table 4 shows that on average an original MTLF may add back 193 lazy constraints, while enhanced MTLF may only add back 91 lazy constraints. Table 4 thus shows computational performance of CPLEX with different lazy constraints setting. For CPLEX, lazy constraints setting with original MTLF information may actually make the computational performance worse by 6.3%, and lazy constraint setting with enhanced MTLF information may make the computational performance better by 2.9% on average, when comparing with the base case. The base case may be the solution time with CPELX solver without any lazy constraints setting.

TABLE 4

|  | AVERAGE # LAZY ADDED BACK | AVERAGE SOLUTION TIME | PERCENTAGE IMPROVEMENT |
|---|---|---|---|
| Base | — | 365.8 seconds | — |
| Original MTLF | 193 | 389 seconds | −6.3% |
| Enhanced MTLF | 91 | 355 seconds | 2.9% |

Figure 12:
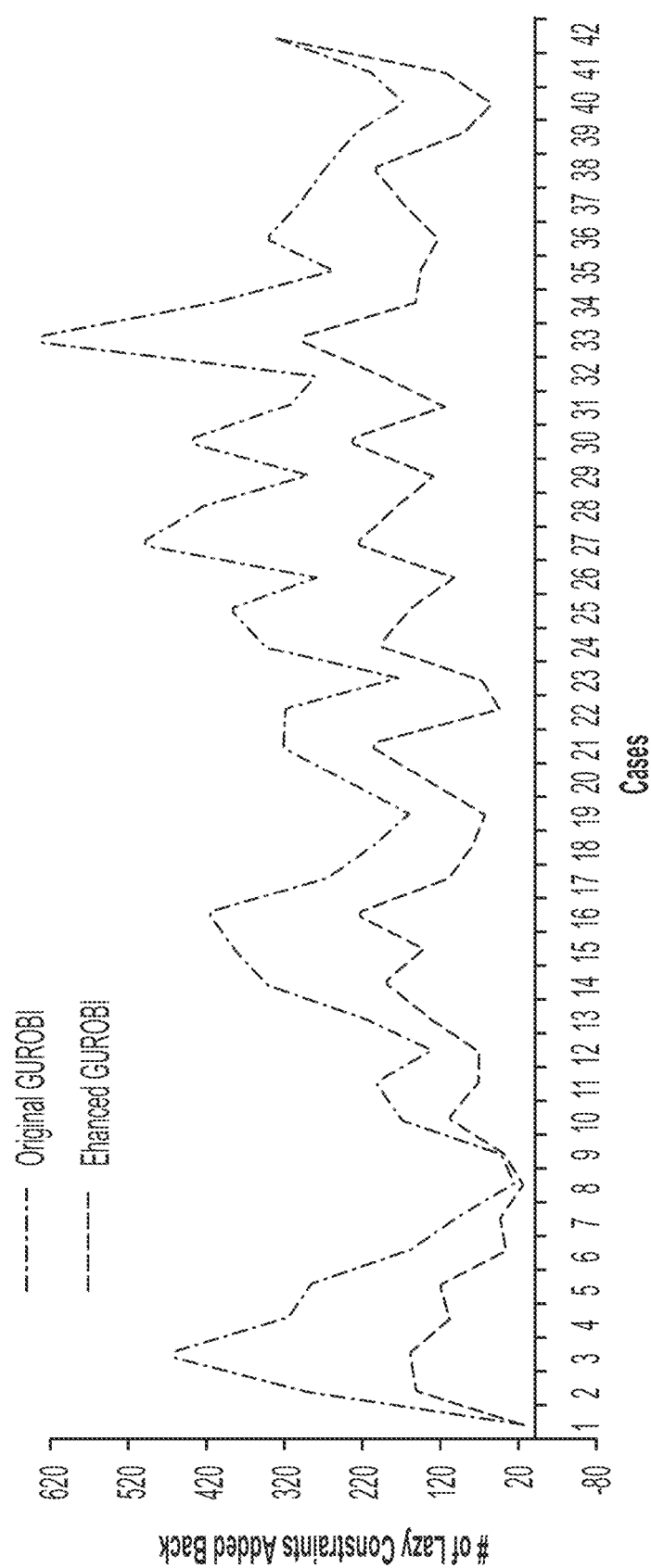
FIG. 12 illustrates a chart with a number of lazy constraints added back to a model by GUROBI, in accordance with one or more embodiments.

From FIG. 12, the number of lazy constraints added back to the model of enhanced MTLF may be significantly reduced comparing with original MTLF in GUROBI solver. FIG. 12 thus illustrates an exemplary chart with a number of lazy constraints added back to a model by GUROBI.

Table 5 shows that, on average, an original MTLF may add back 270 lazy constraints, while an enhanced MTLF may only add back 146 lazy constraints. Table 5 thus shows computational performance of GUROBI with different lazy constraints setting. For GUROBI, lazy constraints setting with original MTLF information may actually make the computational performance better by 17.3%, and lazy constraint setting with enhanced MTLF information may make the computational performance better by 21% on average comparing with the base case. The base case may be the solution time with GUROBI solver without any lazy constraints setting.

TABLE 5

|  | AVERAGE # LAZY ADDED BACK | AVERAGE SOLUTION TIME | PERCENTAGE IMPROVEMENT |
|---|---|---|---|
| Base | — | 305 seconds | — |
| Original MTLF | 270 | 252 seconds | 17.3% |
| Enhanced MTLF | 126 | 241 seconds | 21% |

Some aspects of improving energy offers will now be described. One of the biggest contributors to the difference between MTLF and DAM may be the economic maximum of units. Currently, an MTLF engine may use the offer from the same day of last week, if the energy offer of a unit is still not available. However, this approach may not be the best to estimate the economic maximum for MTLF. It would be beneficial to analyze the economic maximum data for each unit and to generate a better approach to estimate the economic maximum of each unit for MTLF. The economic max of each unit for MTLF may be the economic maximum output for a unit.

The processes disclosed herein may be performed with a computer system comprising one or more computer processors and/or other components. The processors may be configured by machine readable instructions to execute computer program components. The operations of these methods are presented below for illustration purposes.

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor may receive instructions and data from a read-only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

In some embodiments, an electrical power grid, including an electrical power grid, a plurality of power generation participants providing electrical power to the electrical power grid, a plurality of consumers drawing electrical power from the electrical power grid, and a controller that administers a market for the power generation participants and the consumers on the electrical power grid, may be operated. For example, power grid coordination calculations may be performed based upon, at least in part, constraints that pertain to the flow and/or congestion of power on the grid. In this example, the coordination calculations may be managed by reducing the number of constraints used in the coordination calculations, the managing including a first step of coarse screening of the constraints, a second step of deterministic fine screening of the constraints, and a third step of statistical fine screening of the constraints. In this example, the deterministic fine screening step may identify constraints that are redundant and/or dominated by other constraints. In some embodiments, the deterministic fine screening step may follow the coarse screening step. In some embodiments, the coarse screening step may identify non-binding constraints based on maximum or minimum flow on a constraint. In some embodiments, the statistical fine screening step may identify lazy constraints. In some embodiments, the deterministic fine screening step may involve the above-described calculation. In some embodiments, the statistical fine screening step may involve the above-described calculation. In some embodiments, the managing may be applied to a DA market calculation. In some embodiments, the managing may be applied in real-time. In some embodiments, a controller for the electrical power grid may be configured to (i) administer a market for the power generation participants and the consumers on the electrical power grid and (ii) perform the operations set forth above.

Several embodiments of the invention are specifically illustrated and/or described herein. However, it may be appreciated that modifications and variations are contemplated and within the purview of the appended claims.

What is claimed is:

1. A computer-implemented method for operating an electrical power grid, the electrical power grid including a plurality of power generation participants providing electrical power to the electrical power grid, a plurality of consumers drawing electrical power from the electrical power grid, and a controller that administers a market for the power generation participants and the consumers on the electrical power grid, the method including:
    performing power grid coordination calculations based upon, at least in part, constraints that pertain to at least one of the flow and congestion of power on the electrical power grid; and
    managing the coordination calculations by reducing a first number of the constraints, the managing including a first step of coarse screening of the constraints to result in a second number of the constraints that is less than the first number, a second step of deterministic fine screening of the constraints to result in a third number of the constraints that is less than the second number, and a third step of statistical fine screening of the constraints to result in a fourth number of the constraints that is less than the third number, wherein the fourth number enables a compact modeling of a security constraint unit commitment (SCUC) model, wherein eliminated constraints from the first step and the second step are impossible to bind in the SCUC model,
    wherein the second step identifies constraints that are at least one of redundant and dominated by other constraints.

2. The method of claim 1, wherein the second step follows the first step.

3. The method of claim 1, wherein the first step identifies non-binding constraints based on maximum or minimum flow on a constraint.

4. The method of claim 1, wherein the third step identifies lazy constraints.

5. The method of claim 1, wherein the second step involves the following calculation:
    max or min $f_{i,t}$;
    power balance equation without losses $\Sigma_{k \in j}(p_{j,t}) - \Sigma_{n \in N}(P_{n,t}) = 0, \forall t$ $f_{i,t} = \Sigma_{j \in j}\{p_{j,t} B_{i,nj,t}\} + \Sigma_{n \in N}\{P_{n,t} B_{i,n,t}\} \forall i,t$ reserve requirement $\Sigma_{j \in j} r_{j,t} \geq RR_t, \forall t$ resource limit constraints $p_{j,t} + r_{j,t} \leq U_{j,t} \overline{P}_{j,t}, \forall j,t$ $p_{j,t} - r_{j,t} \geq U_{j,t} \underline{P}_{j,t}, \forall j,t$ resource ramp constraints $-U_{j,t} L_t RD_{j,t} \leq p_{j,t} - p_{j,t-1} \leq U_{j,t} L_t RU_{j,t}, \forall j,t$ $0 \leq r_{j,t} \leq \overline{R}_{j,t}, \forall j,t$ if $-\overline{F}_{i,t} \leq f_{i,t} \leq \overline{F}_{i,t}$, then a constraint may be identified as redundant.

6. The method of claim 1, wherein the third step involves the following calculation:
    max or min $f_{i,t}$;
    power balance equation without losses $\Sigma_{j \in j}(p_{j,t}) - \Sigma_{n \in N}(P_{n,t}) = 0, \forall t$ $f_{i,t} = \Sigma_{j \in j}\{p_{j,t} B_{i,nj,t}\} + \Sigma_{n \in N}\{P_{n,t} B_{i,n,t}\} \forall i,t$ reserve requirement $\Sigma_{j \in j} r_{j,t} \geq RR_t, \forall t$ resource limit constraints $p_{j,t} + r_{j,t} \leq U_{j,t} \overline{P}_{j,t}, \forall j,t$ $p_{j,t} - r_{j,t} \geq U_{j,t} \underline{P}_{j,t}, \forall j,t$ $p_{j,t} + r_{j,t} \leq U_{j,t} \overline{SP}_{j,t}, \forall j,t$ $p_{j,t} - r_{j,t} \geq U_{j,t} \underline{SP}_{j,t}, \forall j$, t, where $\underline{SP}_{j,t}$ and $\overline{SP}_{j,t}$ are the statistical lower and upper bonds for the power generation
    resource ramp constraints $-U_{j,t} L_t RD_{j,t} \leq p_{j,t} - p_{j,t-1} \leq U_{j,t} L_t RU_{j,t}, \forall j,t$ $0 \leq r_{j,t} \leq \overline{R}_{j,t}, \forall j,t$ if $-\overline{F}_{i,t} \leq f_{i,t} \leq \overline{F}_{i,t}$, then a constraint may be identified as lazy.

7. The method of claim 1, wherein the managing is applied to a day-ahead (DA) market calculation.

8. The method of claim 1, wherein the managing is applied in real-time.

9. A controller for an electrical power grid, the controller being configured to (i) administer a market for power generation participants and consumers on the electrical power grid and (ii) perform the following:
    power grid coordination calculations based upon, at least in part, constraints that pertain to at least one of the flow or congestion of power on the electrical power grid; and
    management of the coordination calculations by reducing a first number of the constraints, the management including a first step of coarse screening of the constraints to result in a second number of the constraints that is less than the first number, a second step of deterministic fine screening of the constraints to result in a third number of the constraints that is less than the second number, and a third step of statistical fine screening of the constraints to result in a fourth number of the constraints that is less than the third number, wherein the fourth number enables a compact modeling of a security constraint unit commitment (SCUC) model, wherein eliminated constraints from the first step and the second step are impossible to bind in the SCUC model, wherein the second step identifies constraints that are at least one of redundant or dominated by other constraints.

10. A system for operating an electrical power grid, the electrical power grid including a plurality of power generation participants providing electrical power to the electrical power grid, a plurality of consumers drawing electrical power from the electrical power grid, and a controller that administers a market for the power generation participants and the consumers on the electrical power grid, the system comprising:

one or more processors; and a computer readable medium having executable instructions stored thereon such that the one or more processors, in response to execution of the instructions, are operative to:

perform power grid coordination calculations based upon, at least in part, constraints that pertain to at least one of the flow and congestion of power on the electrical power grid; and manage the coordination calculations by reducing a first number of the constraints, the managing including a first step of coarse screening of the constraints to result in a second number of the constraints that is less than the first number, a second step of deterministic fine screening of the constraints to result in a third number of the constraints that is less than the second number, and a third step of statistical fine screening of the constraints to result in a fourth number of the constraints that is less than the third number, wherein the fourth number enables a compact modeling of a security constraint unit commitment (SCUC) model, wherein eliminated constraints from the first step and the second step are impossible to bind in the SCUC model, wherein the second step identifies constraints that are at least one of redundant and dominated by other constraints.

11. The system of claim 10, wherein the second step follows the first step.

12. The system of claim 10, wherein the first step identifies non-binding constraints based on maximum or minimum flow on a constraint.

13. The system of claim 10, wherein the third step identifies lazy constraints.

14. The system of claim 10, wherein the second step involves the following calculation:

max or min $f_{i,t}$;

power balance equation without losses $$\Sigma_{j\in J}(p_{j,t})-\Sigma_{n\in N}(P_{n,t})=0, \forall t$$

$$f_{i,t}=\Sigma_{j\in J}\{p_{j,t}B_{i,nj,t}\}+\Sigma_{n\in N}\{P_{n,t}B_{i,n,t}\} \forall i,t$$

reserve requirement $$\Sigma_{j\in J}r_{j,t}\geq RR_t, \forall t$$

resource limit constraints $$p_{j,t}+r_{j,t}\leq U_{j,t}\overline{P}_{j,t}, \forall j,t$$

$$p_{j,t}-r_{j,t}\geq U_{j,t}\underline{P}_{j,t}, \forall j,t$$

resource ramp constraints $$-U_{j,t}L_tRD_{j,t}\leq p_{j,t}-p_{j,t-1}\leq U_{j,t}L_tRU_{j,t}, \forall j,t$$

$$0\leq r_{j,t}\leq \overline{R}_{j,t}, \forall j,t$$

if $-\overline{F}_{i,t}\leq f_{i,t}\leq \overline{F}_{i,t}$, then a constraint may be identified as redundant.

15. The system of claim 10, wherein the third step involves the following calculation:

max or min $f_{i,t}$;

power balance equation without losses $$\Sigma_{j\in J}(p_{j,t})-\Sigma_{n\in N}(P_{n,t})=0, \forall t$$

$$f_{i,t}=\Sigma_{j\in J}\{p_{j,t}B_{i,nj,t}\}+\Sigma_{n\in N}\{P_{n,t}B_{i,n,t}\} \forall i,t$$

reserve requirement $$\Sigma_{j\in J}r_{j,t}\geq RR_t, \forall t$$

resource limit constraints $$p_{j,t}+r_{j,t}\leq U_{j,t}\overline{P}_{j,t}, \forall j,t$$

$$p_{j,t}-r_{j,t}\geq U_{j,t}\underline{P}_{j,t}, \forall j,t$$

$$p_{j,t}+r_{j,t}\leq U_{j,t}\overline{SP}_{j,t}, \forall j,t$$

$p_{j,t}-r_{j,t}\geq U_{j,t}\underline{SP}_{j,t}, \forall j, t$, where $\underline{SP}_{j,t}$ and $\overline{SP}_{j,t}$ are the statistical lower and upper bounds for the power generation resource ramp constraints $$-U_{j,t}L_tRD_{j,t}\leq p_{j,t}-p_{j,t-1}\leq U_{j,t}L_tU_{j,t}, \forall j,t$$

$$0\leq r_{j,t}\leq \overline{R}_{j,t}, \forall j,t$$

if $-\overline{F}_{i,t}\leq f_{i,t}\leq \overline{F}_{i,t}$, then a constraint may be identified as lazy.

16. The system of claim 10, wherein the managing is applied to a DA market calculation.

17. The system of claim 10, wherein the managing is applied in real-time.

* * * * *